(12) United States Patent
Palmowski et al.

(10) Patent No.: US 7,140,273 B2
(45) Date of Patent: Nov. 28, 2006

(54) SEMI-AUTOMATIC WIRE PROCESSING APPARATUS

(75) Inventors: David Palmowski, Syracuse, NY (US); Thomas S Carpenter, Cazenovia, NY (US); Markus Widmer, Thun, NY (US); Beat Locher, Thun, NY (US)

(73) Assignee: Schleuniger Holding AG (CH)

( * ) Notice: Subject to any disclaimer, the term of this patent is extended or adjusted under 35 U.S.C. 154(b) by 0 days.

(21) Appl. No.: 10/818,679

(22) Filed: Apr. 6, 2004

(65) Prior Publication Data

US 2004/0255723 A1  Dec. 23, 2004

Related U.S. Application Data

(63) Continuation of application No. 09/787,326, filed on Jun. 5, 2001, now abandoned.

(51) Int. Cl.
*H02G 1/12* (2006.01)

(52) U.S. Cl. .......................................... 81/9.51; 81/9.44

(58) Field of Classification Search ................ 81/9.51, 81/9.44, 9.42
See application file for complete search history.

(56) References Cited

U.S. PATENT DOCUMENTS

| | | | | | |
|---|---|---|---|---|---|
| 2,671,363 | A | * | 3/1954 | Wells | 81/9.51 |
| 3,895,426 | A | * | 7/1975 | Papsdorf | 29/867 |
| 4,185,522 | A | * | 1/1980 | Reinertz et al. | 81/9.51 |
| 4,619,164 | A | | 10/1986 | Aikens | |
| 4,745,828 | A | * | 5/1988 | Stepan | 81/9.51 |
| 5,111,720 | A | * | 5/1992 | Stepan | 81/9.51 |
| 5,243,882 | A | * | 9/1993 | Stepan | 81/9.51 |
| 5,596,802 | A | * | 1/1997 | Koch et al. | 29/825 |
| 5,630,341 | A | * | 5/1997 | Hoffa | 81/9.51 |
| 5,653,016 | A | * | 8/1997 | Hoffa | 29/825 |
| 5,664,324 | A | * | 9/1997 | Hoffa et al. | 29/825 |
| 5,787,768 | A | * | 8/1998 | Talley | 81/9.51 |
| 5,979,272 | A | * | 11/1999 | Wollermann | 81/9.51 |

* cited by examiner

*Primary Examiner*—Lee D. Wilson
*Assistant Examiner*—Alvin J. Grant
(74) *Attorney, Agent, or Firm*—Ostrolenk, Faber, Gerb & Soffen, LLP

(57) ABSTRACT

Wire processing apparatus (10). The apparatus (10) includes an electronic memory for storing values commensurate with the lengths from a terminal end of the wire (21) to the positions of cuts to be made through the plurality of coating layers (X,Y,Z), and a mechanical store for controlling the depths of each cut. Threaded shafts (84, 84, 84) are mounted upon a turret which is movable both rotationally and axially with respect to the wire being processed. The electronic memory is preferably adapted to receive inputs representing parameters of sequential steps in each of two processing operations, and to perform such operations alternately, upon different wire ends, upon successive actuation's of the apparatus (10). A further feature of the apparatus is an arrangement permitting the force exerted on the wire (21) by a pair of gripping members (32, 32) to remain substantially constant over a range of different wire diameters. A motor (78) is mechanically linked to the gripping members (32,32) to bring the gripping members to the wire-engaging position.

34 Claims, 21 Drawing Sheets

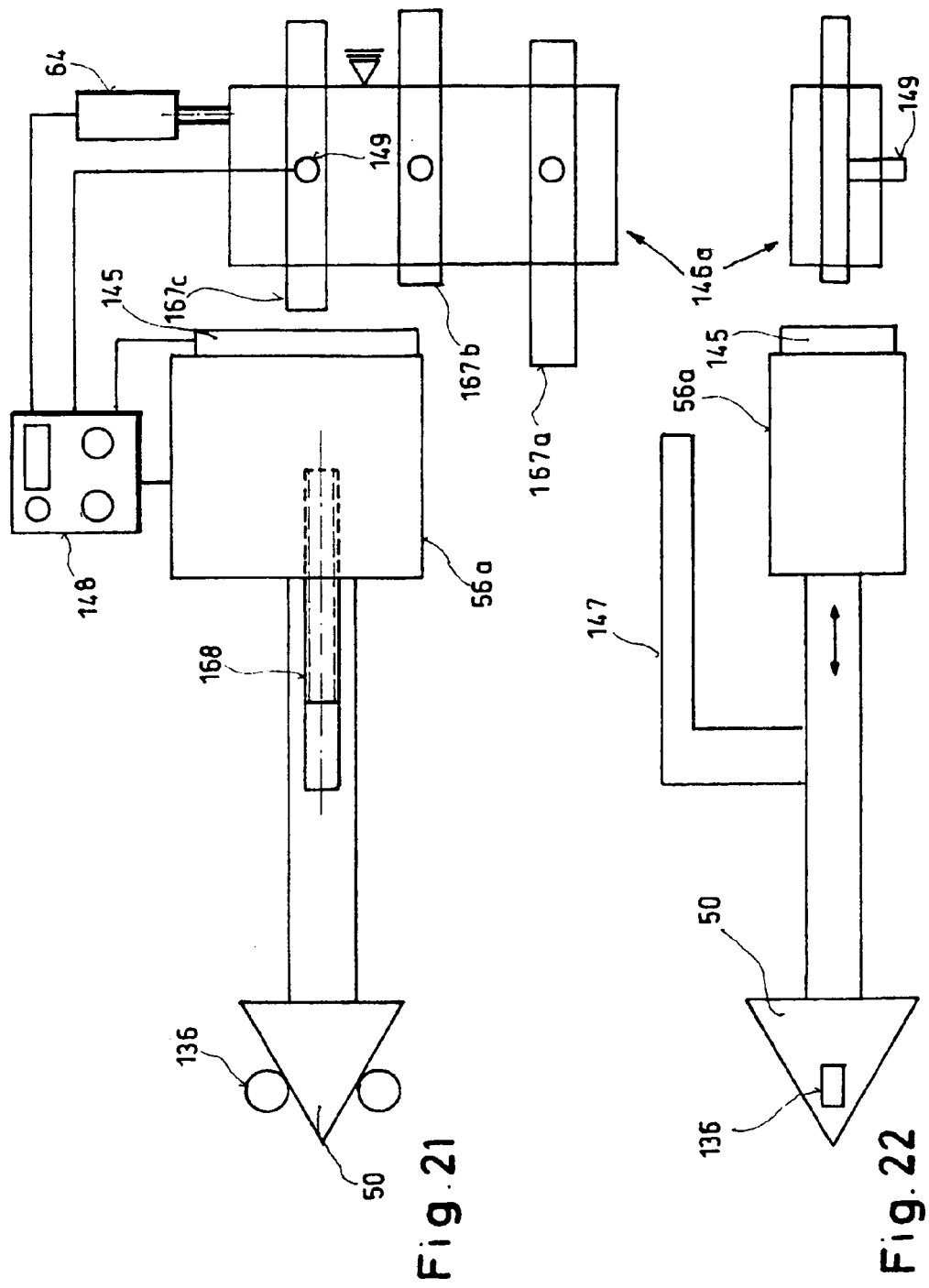

SEMI-AUTOMATIC WIRE PROCESSING APPARATUS

BACKGROUND OF THE INVENTION

The present invention relates to so-called wire processing apparatus wherein a coated, filamentary member, such as an electrical wire or optical fiber, is clamped in a fixed position while blade means sever the coating layer(s) and strip the severed slug(s) from the member.

In this application "fixed" means always "relatively fixed". However the relative movement between the cable and the blades could also be performed by a movement of the cable instead a movement of blades, e.g.

In a preferred form, the apparatus of the invention is operable to successively sever and strip a plurality of coating layers from the filamentary member. Although it will be understood that the present invention, and related prior art equipment, may be used with many types of filamentary workpieces, for simplicity of discussion the workpiece will be considered an electrical cable having a central core and a plurality of coating or covering layers of electrical insulation, magnetic shielding, and the like, i.e., such as a coaxial cable, and will be referred to as a "wire" throughout the following written description.

A wide variety of equipment has been devised for the purpose of severing and stripping coating layers from coaxial cables, and other wires with a plurality of coating layers. Such equipment may be constructed for entirely manual operation, fully automated operation, or some combination of the two. Examples of fully automated cutting/stripping machines may be found in U.S. Pat. Nos. 5,111,720, 4,243,882, and related patents of the assignee and applicant, wherein values representing a plurality of lengths (from the end of the cable to the longitudinal position of the cut) and radial depths of successive cuts, each through a different covering layer, may be entered via a keypad and stored in electronic memory. Upon actuation, the equipment proceeds automatically to make successive cuts through the covering layers at the lengths and depths stored in memory.

It is a principal object of the present invention to provide apparatus for successively cutting through a plurality of layers of a coaxial cable at different lengths and depths with some settings entered by an operator and stored in a purely mechanical manner with other settings entered and stored electronically. That is, the principal object of the invention is to provide novel and improved hybrid or semi-automatic apparatus for cutting through a plurality of covering layers at various lengths and depths of cuts.

The applicant published after the priority date of this application also the WO-A-99/34493. This WO-A is based on an earlier priority and discloses a hand driven stripping tool, where cutting depths are also stored semi-automatically in order to allow a semi automatically stripping of coaxial cables. The technique of the particular mechanical storing component as disclosed in the drawings 4–6 and the respective specification of said WO-A is enclosed herewith by reference. Also enclosed by reference are all claims and introductory parts of the specification of that WO-A.

Another object is to provide apparatus for gripping a wire with a substantially constant force over a range of wire diameters as cutting and stripping of covering layers is performed.

A further object is to provide wire processing apparatus with means for storing two sets of values relating to lengths of cuts and/or other variables and for performing functions commensurate with each set of values alternately on two different wire ends.

Still another object is to provide novel and improved means for mechanically storing a plurality of radial depths of cuts to be made in covering layers of a coaxial cable and for implementing successive cuts at the mechanically stored depths.

Other objects will in part be obvious and will in part appear hereinafter.

SUMMARY OF THE INVENTION

It is to be noted that wherever in the following specification or claims a device is defined by a "means plus function" wording, the applicants refer to what is disclosed in this application literally or pictorially and any other means which are qualified to perform the recited function. The following specification and claims are thus not limited to equivalents of the literally or pictorially disclosed means only.

The wire processing apparatus of the invention includes a pair of reciprocating gripping jaws which are initially separated for axial insertion therebetween of a coaxial cable, or the like. After the apparatus has been initialized, as described later, the cable is inserted until its terminal end contacts blade means which subsequently effect the cutting operation. The jaws are then pivoted toward a closed position by operation of a drive, for example a linear actuator to move a wedge, for example, to rotate the jaws until they grip the cable. The actuator is programmed to move the wedge, and thereby the jaws, by a distance commensurate with the diameter of the wire being clamped. That is, the distance of movement of the actuator is variable in accordance with the wire diameter to ensure that the gripping force is sufficient to prevent movement of the cable as axial forces are exerted thereon while avoiding excessive gripping forces.

The apparatus includes a pair of blades having cutting edges movable toward and away from one another to effect cutting through the covering layers on the cable. The blades are—in one particular example of the invention—initially in a closed position, i.e., the cutting edges of the blades are substantially in mutual contact, and serve as a stop means for contact by the end of the cable to establish the limit of axial insertion thereof. Arms carrying the blades are then pivoted to rotate the blades to an open position, i.e., to separate the cutting edges, and the cutting mechanism, including the blades is moved axially of the cable (a relative movement between cable and blades is performed respectively) to position the blades adjacent the axial portion of the cable wherein the first cut is to be made. The distance of axial movement of the blades, i.e., the "length of cut," is controlled by a drive, for example a stepper motor acting on a lead screw to move a carriage upon which the cutting means are mounted. Electrical signals provided to the stepper motor for establishing the lengths of each of a plurality of successive cuts are controlled by an electronic memory which stores values entered by an operator via a keypad on the apparatus, in conventional manner. The axial values may also be stored in mechanical stores, as e.g., disclosed and incorporated by reference herein said WO-A.

The depth of a cut, i.e., the distance of radial movement of the blades toward the axis of the cable, is determined by the axial position of a stop member which physically contacts and axially moves a conical cam member to effect radial movement of the blades. A rotatable turret is fitted with a plurality of threaded shafts and a fixed shaft. All of the shafts have axes parallel to the axis of rotation of the turret and are spaced equally therefrom. The threaded shafts are engaged in respective nuts which are manually rotatable for reciprocal, axial movement of the shafts, thereby providing individual, selective positioning of the terminal end of each shaft. The turret is indexed by a linear actuator betveen—e.g.—four rotational positions. The terminal end of a different one of the four shafts (three selectively, axially movable, one fixed) is positioned in alignment with the member which effects radial movement of the blades in each of the four turret positions. The turret is mounted on a carriage which is movable in a direction parallel to the axes of the shafts. The carriage moves a fixed distance, between predetermined rear and forward positions, upon each actuation. Thus, the extent of radial movement of the blades (depth of cut) is controlled by the position of the end of the shaft in alignment with the cam member. The turret is rotatably indexed after each cut is completed to position the end of a different shaft in alignment with the cam member, the fixed shaft always being in this position, with the carriage in its forward position, at the beginning of each cycle to establish the initialized (fully closed) position of the blades. The nuts which adjust the axial positions of the threaded shafts to establish the desired depths of cuts are manually accessible through an opening in the top of the apparatus housing (or controlled by a gear drive in a remote controlled manner—remote controlled by electrically driven actuators or by a hand remote control)

A unique keypad and control circuit is provided for entry by an operator of values and control functions. Among other features, the keypad permits entry of a first plurality of cutting and/or strip lengths for sequentially severing and fully or partially removing a plurality of coating layers on one end of a wire, and a second plurality of values for sequential cutting/stripping operations on the other end of the wire. Of course, the wire is removed from the clamping means, reversed end-for-end and replaced in the clamping means between the first and second sequence of operations.

Further improvements and variants are denoted in a claims. The claims 24–72 will be discussed in the following with some detail.

Apparatus of claim 24 is not restricted to a special frame and wall construction since it is not restricted to a manual adjustment of the individual elements of the mechanical storing devices. This adjustment could be done by any other means than a mans hand. Such means cover also pneumatical, electrical or electronical controlled drives or they like for adjusting the individual elements. A further improvement could be an additional system for mechanical or electronical storing a plurality of length value information as denoted in claim 25. Claim 26 and 27 reflect the different approach between a manual and a remote controlled adjustment at the elements of a storing device.

Since the invention could be used also in an open environment or within a bigger cable processing apparatus the invented apparatus does not need in any case a closed housing. However, as one of the inventive examples refers to a stand alone apparatus with manual adjustment, walls and an opening for manual access are provided in those cases. The openings have in most examples lids or covers to protect a mechanical storage device during operation.

Claims 31 and 34 reflect different but similar possibilities for releasing the mechanical storage. Individual elements like shafts could be easily adjusted and could be easily used for controlling a wedge which is normally used for controlling the cutting depths of blades.

A variant can be seen in cam control devices or any stop services on a control device. Such stop devices or cam control devices could be provided as prefabricated elements which can be inserted and adjusted within a novel apparatus.

To control a wedge which is normally used for controlling the cutting depths of plates a second wedge could be used which could have also stairway like stops to push and hold the other wedge in a certain relative position.

Fixed stop elements or electrical switches or the like could be used for stopping the movement of a carriage responsible for moving length and all depth defining elements or gears. Such fixed position stops could be in a variant also only relatively fixed positioned as they could—for example—be shifted upon demand by pneumatic, magnetic or electrical drives.

Claim 36 refers to a position sensor which allows a semi automatic control and or a reset to definitive positions. It further allows to send position information to a read out.

The advantage of the feature of claim 37 relates to a reliable inventive apparatus especially usable for cable stripping processes of a great quantity of identical cable ends.

Claim 40 refers to the invention from a different point of view and specifies the preferred arrangement of a mechanical depth information storage within the apparatus. An arrangement between normal depth control devices and respective drives is practical and easy to be mounted. The maintenance of such storage is easy. However, other systems where the storage blocks the movement of any depth control mechanics in a parallel way are qualified to keep the overall length of the inventive apparatus small.

Claims 41–43 refer to further improvements of the apparatus of claim 40.

Claims 44 and 46 refer to one important principle of the invention namely the use of a mechanical storage together with other types of different storage devices.

The invention further allows and points at a novel and independently usable system of new adjustment of such an apparatus as referred to in claim 47 and 48.

The measures of claim 49 allow an improved and smoother or quicker operation of an inventive apparatus.

Claim 50 refers to another concept of the invention wherein a mechanical store with a minimum of two storage sites is propelled by electric or pneumatic control. The further improvement denoted in claim 51 allows control of the clamping pressure of a cable clamping mechanism of the invention with a spring loaded system. That system could be also used independently of the disclosed depth or length controlling devices.

A novel clamping pressure applying system allows a two step clamping process which is advantageous since in the first step the clamp could be closed extremely quickly and in the second step the closing could be continued gently by increasing pressure on the cable in an non disturbing manner. In total the time for treating or processing a cable is reduced.

Claim 55 indicates alternatives to a manual operable actuator which allow an operator to use his hands fully for handling the cables. Besides using a pedal, any other means of actuation like voice actuation or the like could be used within the scope of the invention.

Claim 56 is a further independent claim and slightly different from claim 1 or 24. Claims 57 through 62 refer to further improvements.

Claim 63 refers to an improved gripper system of an inventive apparatus. That gripper system could be used completely independent from the depth and length control storage's. Claim 63 is slightly less restricted than claim 20.

Claim 69 refers to a novel method of storing cutting depth information and stripping a cable. However, this method covers also a system where the cutting plates move along a gauge or a prestripped cable in order to "feel" its length and depth information. By levers or sensors that "feeled" information is sent to the storage.

WO 98/08283 is owned by the applicant and is incorporated by reference. This incorporated technology is especially qualified to handle and measure weak cables.

The foregoing and other features of construction and operation of the invention will be more readily understood and fully appreciated from the following detailed disclosure, taken in conjunction with the following detailed description and accompanying drawings.

BRIEF DESCRIPTION OF THE DRAWINGS

FIGS. 21 and 22 refer to a variant of a wedge control system of a novel device for storing cutting depth information and for controlling the blade;

The drawings 17–27 are just sketches which show just the principle of the respective technical idea. They have not to be taken on a scaled basis.

DETAILED DESCRIPTION

Figure 1:
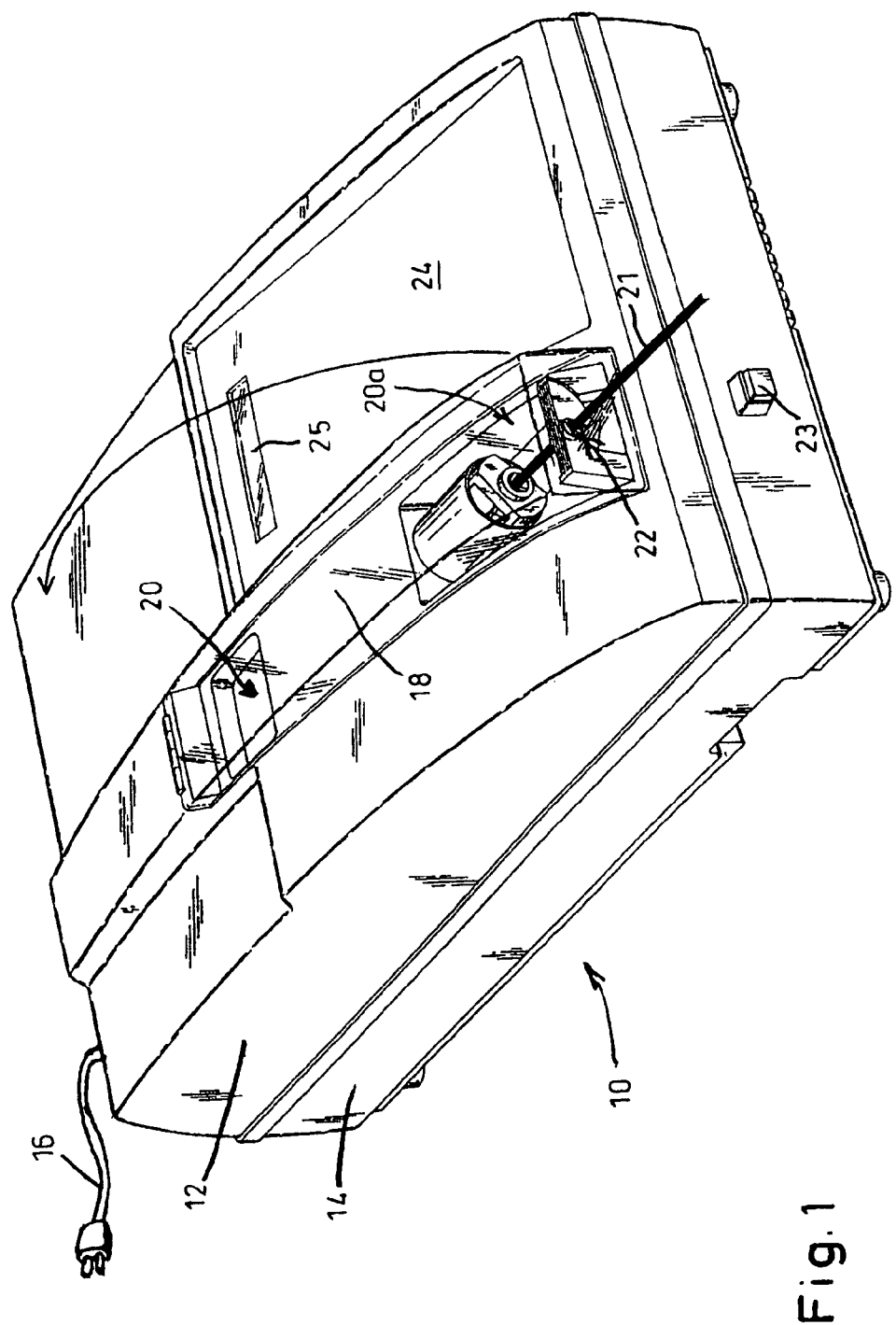
FIG. 1 is a perspective view of a housing for apparatus embodying the invention.

Referring now to the drawings, an example of apparatus for processing elongated, filamentary members such as coaxial cable is seen in FIG. 1, denoted generally by reference numeral 10. Apparatus 10 includes an external housing having upper and lower sections 12 and 14, respectively, wherein both mechanical and electrical components are housed. Power cord 16, for connection to an appropriate AC source, extends from the housing. Transparent safety shield 18 is hingedly attached to upper housing section 12 for movement between covering and uncovering positions with respect to openings 20 (if provided) and 20a. A workpiece in use such as wire 21 extends through an opening 22 in a shield 18 when the latter is in the covering position as covering layer(s) on the cable 21 are cut and, if desired, stripped from the cable. Actuation or cycling button 23 is provided on the front surface of lower section 14. It may be replaced or substituted by a remote control pedal or the like. Keypad 24 and display window 25, described later in more detail, are provided on the top surface of upper housing section 12 for entering values to be stored in a memory within the housing, and for effecting other control functions.

Figure 2:
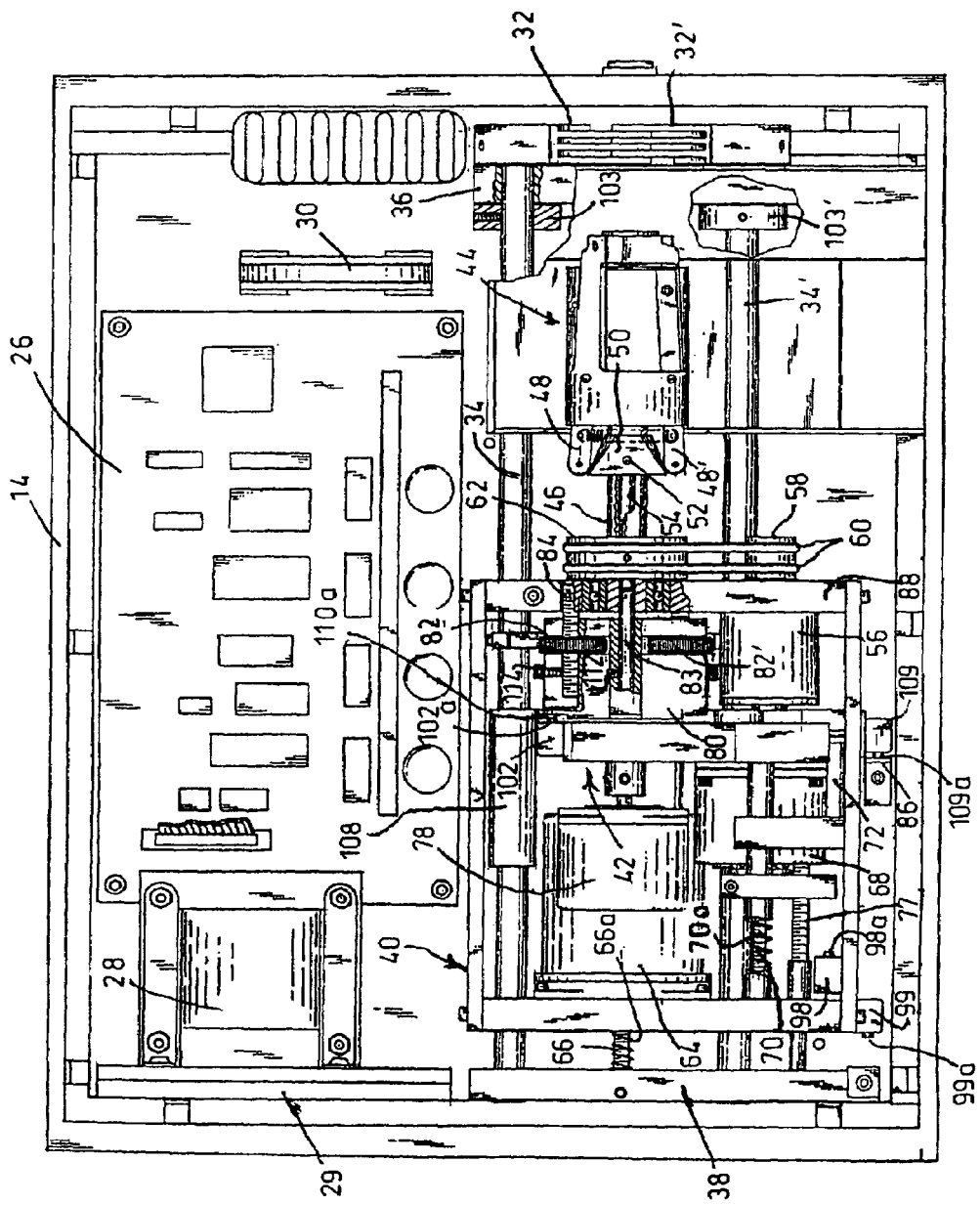
FIG. 2 is a plan view of the apparatus of FIG. 1 with the housing cover removed.
Figure 3:
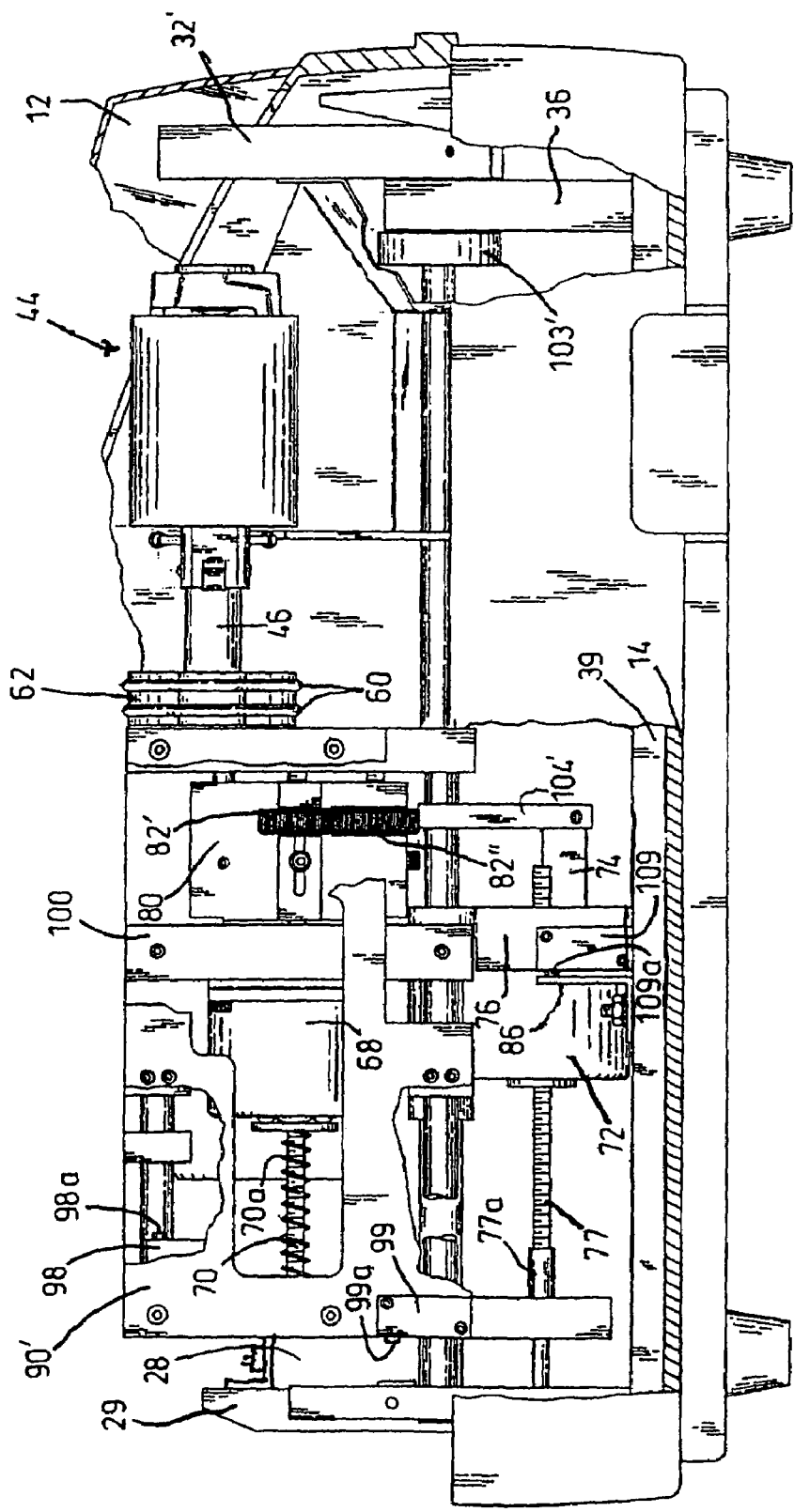
FIG. 3 is a side elevational view of the apparatus of FIG. 2.

Components housed within lower section 14 are shown in plan view in FIG. 2 and in side view in FIG. 3. Circuit board 26, transformer 28 and fan 30 are contained in the upper (as viewed from the top in FIG. 2) part of section 14, transformer 28 being secured to plate 29. An additional circuit board (not shown) is preferably mounted on the lower surface of upper housing section 12, directly under keypad 24. A pair of gripper members 32, 32' are mounted at what is termed the forward side of apparatus 10, i.e., the right side as viewed in FIG. 2, upon the ends of rods 34, 34', respectively. Rods 34, 34' are rotatably supported in forward and rear end plates 36 and 38 (FIG. 4), respectively, of a fixed frame within lower housing section 14. Outer carriage 40 and inner carriage 42 are each mounted for reciprocal movement toward the forward and rear sides of the apparatus. As explained later, inner carriage 42 moves together with outer carriage 40, but is also movable with respect thereto.

Cutting mechanism, indicated generally by reference numeral 44, is mounted rearwardly of gripper members 32, 32' upon hollow shaft 46 which is rotatably mounted upon outer carriage 40. Cutting mechanism 44 includes a pair of blades having opposed cutting edges and mounted upon the forward ends of respective, pivotally mounted arms 48, 48'. Rollers carried at the rear ends of arms 48, 48' are spring biased into contact with the surface of member 50, essentially flat on the top and bottom and tapered on the sides, which is slidably mounted upon hollow shaft 46 for axial movement relative to arms 48, 48'. Member (wedge) 50 is connected by pin 52, extending through elongated slots in hollow shaft 46, to rod 54 which is positioned within hollow shaft 46. Axial movement of rod 54 moves member 50 to rotate arms 48, 48' and effect movement of the blades toward and away from one another. Member 50 is shown in FIG. 2 in its forwardmost position, wherein the blades are fully closed with their cutting edges in mutual contact. Construction and operation of cutting mechanism 44 is entirely conventional, corresponding essentially to that disclosed in U.S. Pat. No. 4,993,147, incorporated by reference herein, although further details relating conventional portions of the cutting mechanism to novel elements of the present invention appear hereinafter.

Movement of various elements of apparatus 10—in this example of the invention—is effected by one electric motor and four linear actuators, also known as stepper motors. Electric motor 56 is mounted upon outer carriage 40 for rotation of pulley 58, connected by at least one belt 60 or toothed belts to pulley 62 for rotation of cutter mechanism 44. Stepper motor 64 is mounted upon outer carriage 40 and operates upon axially stationary lead screw 66 to effect reciprocating movement of the outer carriage 40. Stepper motor 68 is mounted upon inner carriage 42 and operates upon lead screw 70 to effect reciprocating movement of the inner carriage 42 relative to outer carriage 40. Stepper motor 72 and wedge 74 (FIG. 7) are fixedly mounted upon frame member 76 which is slidably mounted on rods 34, 34'; operation of motor 72 acts upon lead screw 77 to move wedge 74 in forward and rear directions to operate gripper jaws 32, 32', as described later. Stepper motor 78 is mounted on inner carriage 42 and has an output shaft connected to rotatable turret 80 to index the latter between four positions, as also described later in more detail. Instead of a stepper motor the rotation of the turret may be performed by any drive which allows a qualified positioning of the threaded shafts 84. Turret 80 carries fixed shaft 83 and three nuts 82, 82', 82", each engaging a respective threaded shaft, one of which, indicated by reference numeral 84, may be seen in FIG. 2, the other two being shown in later Figures. Additional reference numerals, denoting elements described later, also appear in FIGS. 2 and 3.

Figure 4:
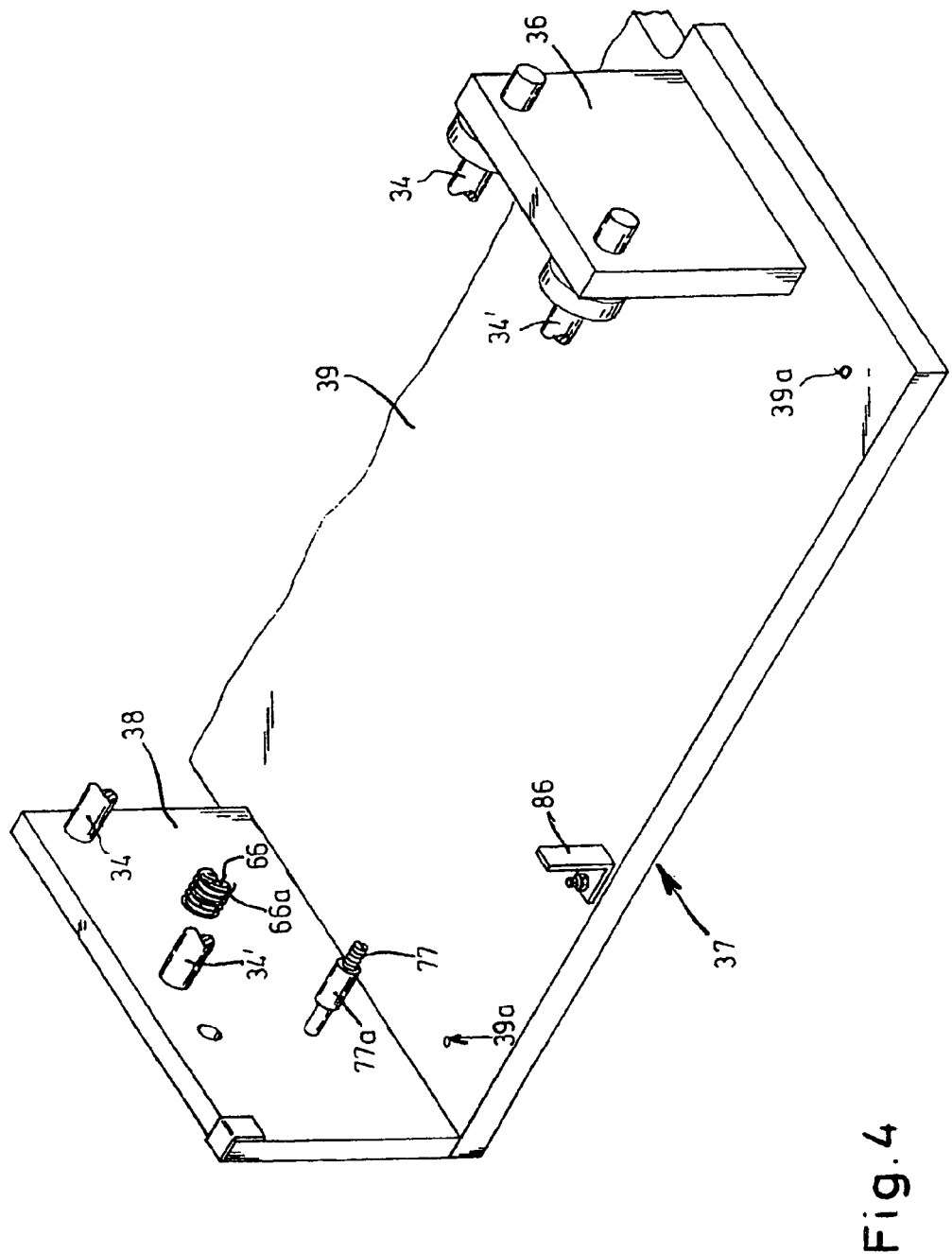
FIGS. 4 through 7 are fragmentary, perspective views, some exploded and some partly in section, of various portions of the apparatus.

Having thus generally described various components in fully assembled condition, attention is now directed to FIGS. 4, et seq., where further details of construction and operation of these and other components will be more readily apparent. Fixed frame 37, shown separately in FIG. 4, is provided by base plate 39 with rigidly affixed, vertically disposed end plates 36 and 38. Frame 37 is affixed to the lower wall of housing section 14 by bolts passing through openings 39a in base plate 39. L-shaped bracket 86 is affixed to base plate 39, and rotatable shafts 34, 34' are mounted in bearings in end plates 36 and 38, as previously mentioned. Lead screws 66 and 77 are each rotatably mounted at one end upon, and extend from, end plate 38. It will be noted that lead screw 77 forms one portion of a rod having a smooth, cylindrical portion 77a which, as described later, extends slidably through an opening in a wall of outer carriage 40.

Figure 5:
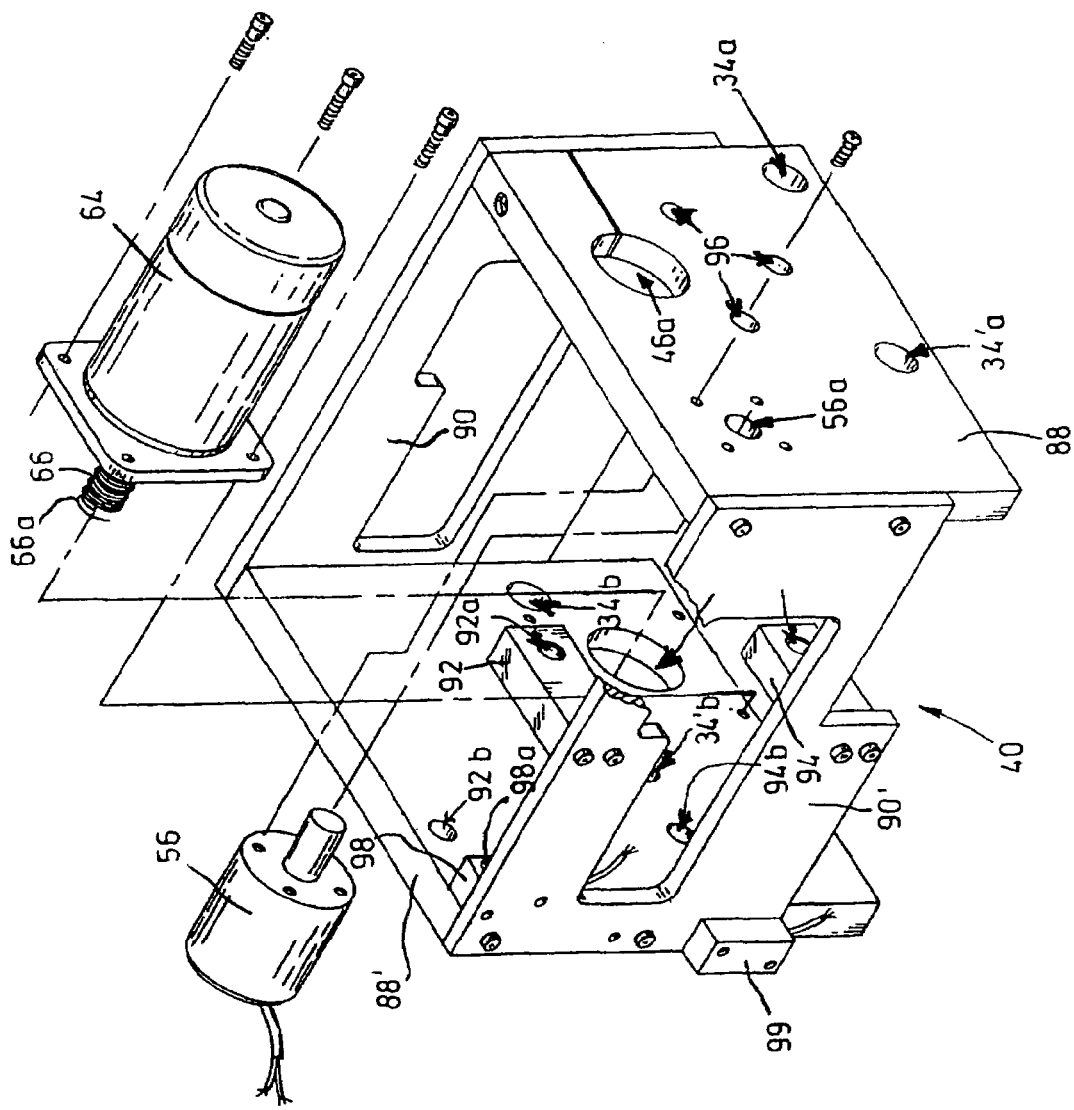

Turning now to FIG. 5, outer carriage 40 is seen to comprise four rigidly connected walls, namely, front and back walls 88 and 88', respectively and side walls 90. 90'. Blocks 92 and 94, having respective openings 92a and 94a, are affixed to and extend inwardly from the inside surface of side wall 90'. Motor 56 and stepper motor 64 are shown exploded away from their fixed mountings upon the inner surfaces of front and back walls 88 and 88', respectively. The following through openings are provided in front plate 88: opening 46a for bearings 46b (FIG. 6) in which shaft 46 of the cutting mechanism is journaled, openings 34a, 34'a for rods 34, 34', opening 56a for the shaft of motor 56 and surrounding small openings for screws to attach the motor to wall 88, and openings 96 to provide clearance for the forward ends of three of the four shafts on turret 80 which are aligned with openings 96 when the turret is moved, with inner carriage 42, from its rear to its forward position. Through openings 34b, 34'b, 66a, 92b and 94b are provided in rear wall 88'. Limit switch 98, having forwardly disposed contact button 98a is fixedly mounted at the upper portion of the inside junction of walls 88' and 90'. Limit switch 99, having rearwardly disposed contact button 99a (FIGS. 2 and 3) is affixed to the lower rear corner of the outer surface of side plate 90'.

Figure 6:
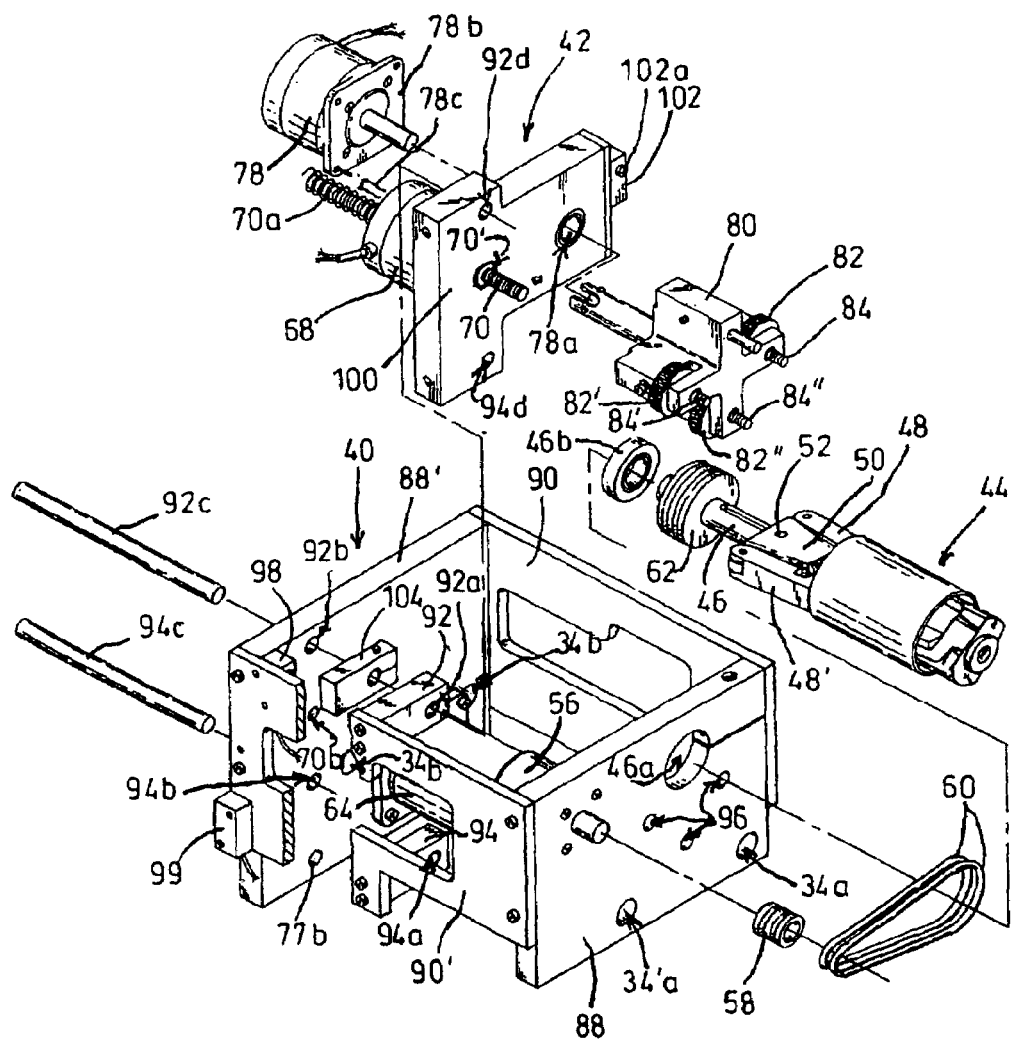

In FIG. 6, outer carriage 40 is shown in combination with inner carriage 42 and portions of cutter mechanism 44 and turret 80 carried thereon. Inner carriage 42 is seen to consist of an essentially T-shaped plate 100; stepper motor 68 is mounted on the rear surface and limit switch 102, having forwardly disposed contact button 102a, is mounted on a side surface of plate 100. The shafts of stepper motor 78 and turret 80 extend through opening 78a in plate 100 and are connected to one another for rotational indexing of the turret by the motor. Flange 78b of stepper motor 78 is spaced rearwardly from plate 100, being connected thereto by rod 78c so that the motor and turret shafts rotate, rather than the motor itself. Rods 92c and 94c extend slidably through openings 92b and 94b in end wall 88' and through openings 92a and 94a in blocks 92 and 94, the forward ends of the rods being fixedly mounted in openings 92d and 94d in plate 100. Thus, as stepper motor 68 is actuated to travel forwardly and rearwardly upon lead screw 70, inner carriage 42 moves, together with rods 92c and 94c and block 104 which is carried upon rod 92c, relative to outer carriage 40. The elements mounted upon plate 100, i.e., stepper motors 68 and 78, turret 80 and elements carried thereon, and switch 102 move relative to the outer carriage and to cutter mechanism 44. Lead screw 70 extends through opening 70' in plate 100 since the plate moves as screw 70 remains stationary.

Figure 7:
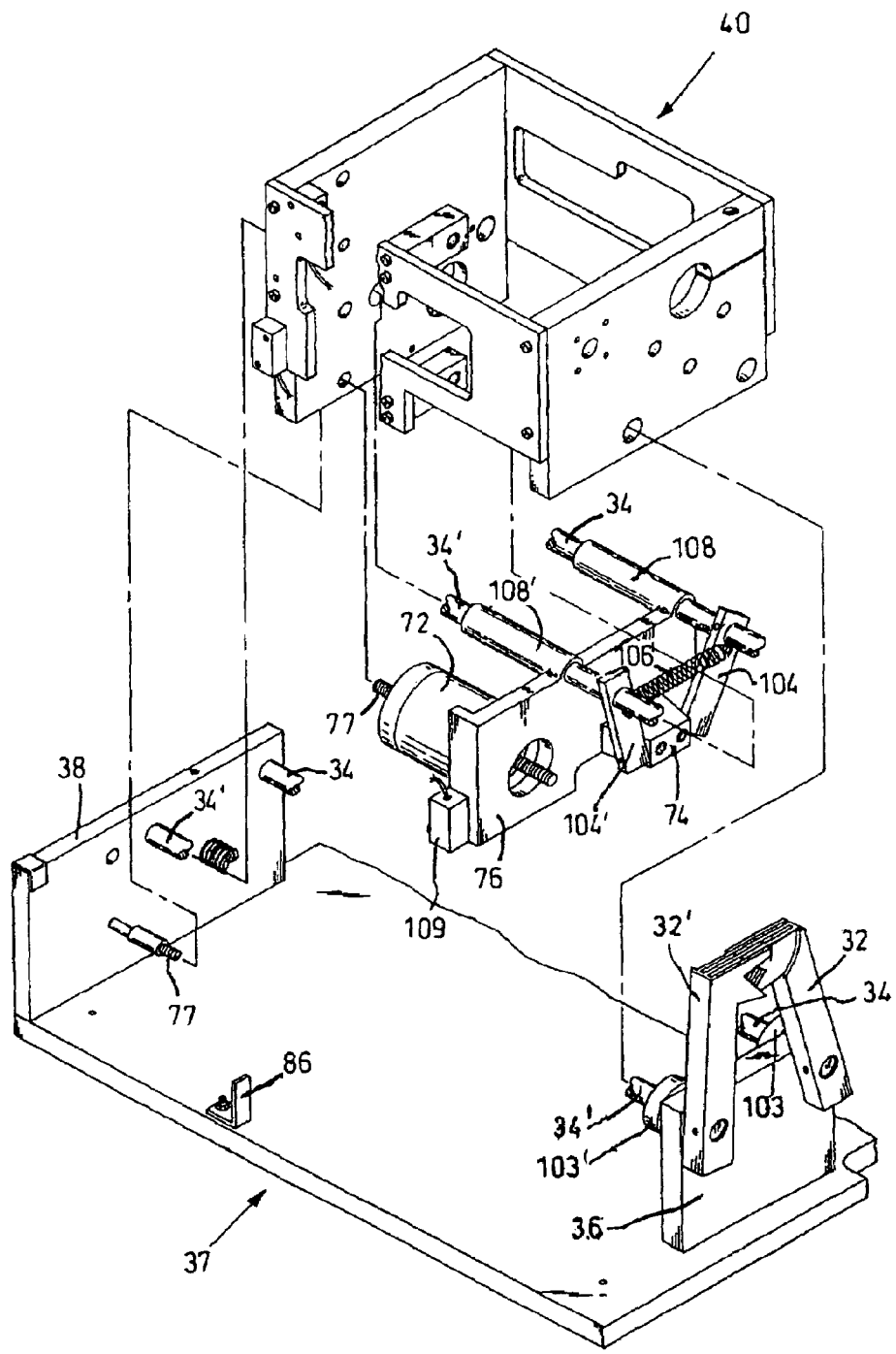

Fixed frame 37 and outer carriage 40 are shown in FIG. 7 in combination with the wire clamping elements. As previously mentioned, gripper members 32, 32' are fixedly mounted on the forward ends of rods 34, 34', respectively, with collars 103, 103' restraining axial movement of the rods. Thus, the V-shaped gripping jaws of gripper members 32, 32' are moved toward and away from one another as rods 34, 34' are rotated in opposite directions. Arms 104, 104' are fixedly connected to rods 34, 34', the lower ends of the arms being biased by spring 106 into contact with the tapered sides of wedge 74. As arms 104, 104' are rotated by forward and rear movement of wedge 74, rods 34, 34' are rotated to move gripper members 32, 32' into and out of engagement with a wire positioned therebetween. Wedge 74 is affixed to frame member 76, upon which stepper motor 72 is mounted, as previously mentioned. Rods 34, 34' extend slidably through sleeve portions 108, 108' which are integral with or fixed on frame member 76. Limit switch 109, having rearwardly directed contact button 109a (FIGS. 2 and 3) is also carried by frame member 76. As stepper motor 72 is actuated to move in forward and rear directions on lead screw 77, frame member 76 and wedge 74 are likewise moved to actuate the gripping mechanism. With this arrangement, the distance of forward movement of the elements from an initial, "home" position, and thus the spacing of the gripping surfaces of gripper members 32, 32' at the forwardmost position of wedge 74, is commensurate with the number of steps which stepper motor 72 is indexed. The initial, rearmost position of frame member 76 is established by contact of rearwardly directed button 109a of contact switch 109 with bracket 86 on fixed frame 37.

Figure 8:
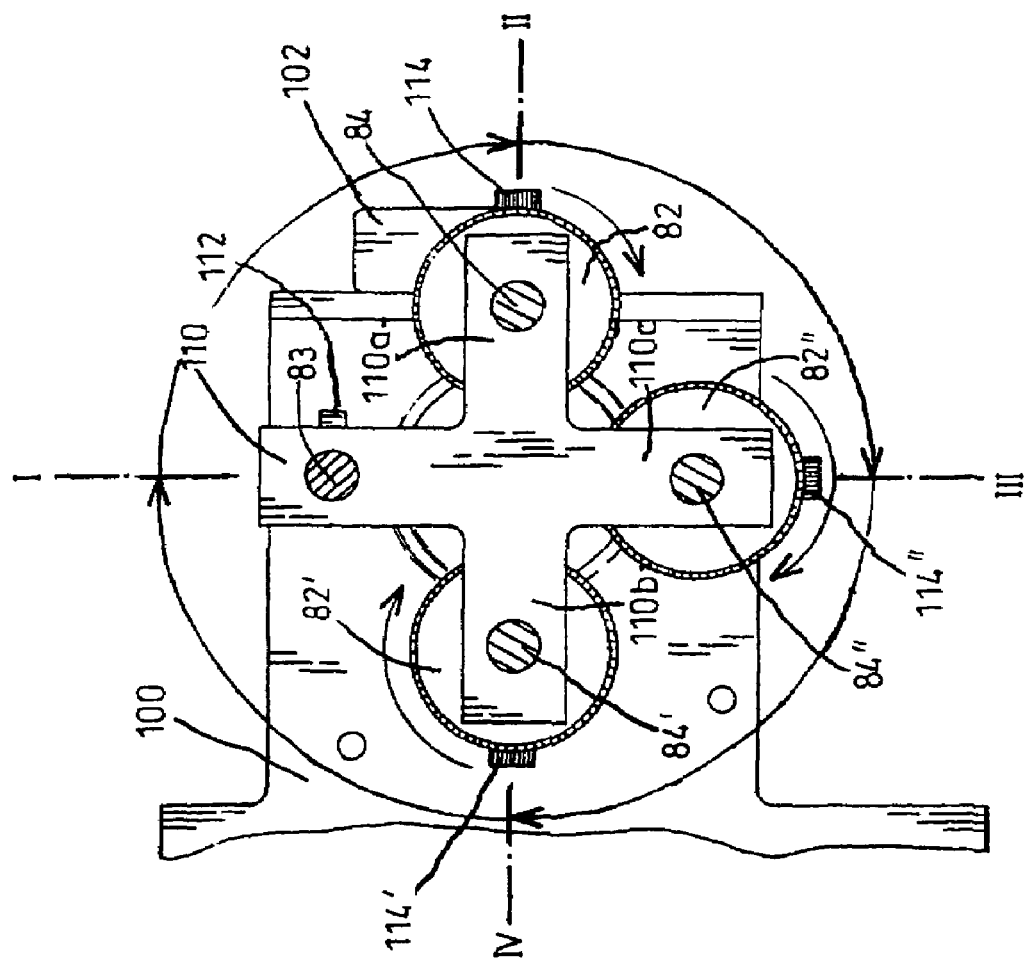
FIG. 8 is a front elevational view of certain elements.

However the invention covers also any other means for providing or detecting a "Home Position". Turret 80 is shown in enlarged, front elevation in FIG. 8, together with a fragment of plate 100. The turret includes four arms 110, 110a, 110b, and 110c at 90 degree intervals. Shaft 83 extends loosely through a passageway in arm 110, and threaded shafts 84, 84', and 84" extend through passageways in arms 110a, 110b, and 110c, respectively. Circular nuts 82, 82' and 82" are positioned in recesses in arms 110a, 110b, and 110c, respectively, in threaded engagement with shafts 84, 84' and 84", respectively. Thus, manual rotation of nuts 82, 82' and 82" moves shafts 84, 84', and 84" axially with respect to turret 80. In this example the rotation is to be performed manually. Set screw 112 extends through one side of arm 110, into the passageway wherein shaft 83 is positioned, to permit axial adjustment of shaft 83 when screw 112 is backed off and to fix the axial position of shaft 83 when screw 112 is tightened against the shaft. This is considered a factory or technician-performed adjustment; that is, the axial position of shaft 83 is not intended to be changed by an operator of apparatus 10 and is considered to be fixed during normal cutting/stripping operations. Set screws 114, 114' and 114", on the other hand, have—in this example—knurled heads for manual engagement by an operator to back off these screws as the operator turns nuts 82, 82' and 82" to adjust the axial positions of shafts 84, 84', and 84" to set up the apparatus for normal operation in the manner described later.

This set up could also be done also remote controlled, as it will be described in FIGS. 12–14.

Figure 9:
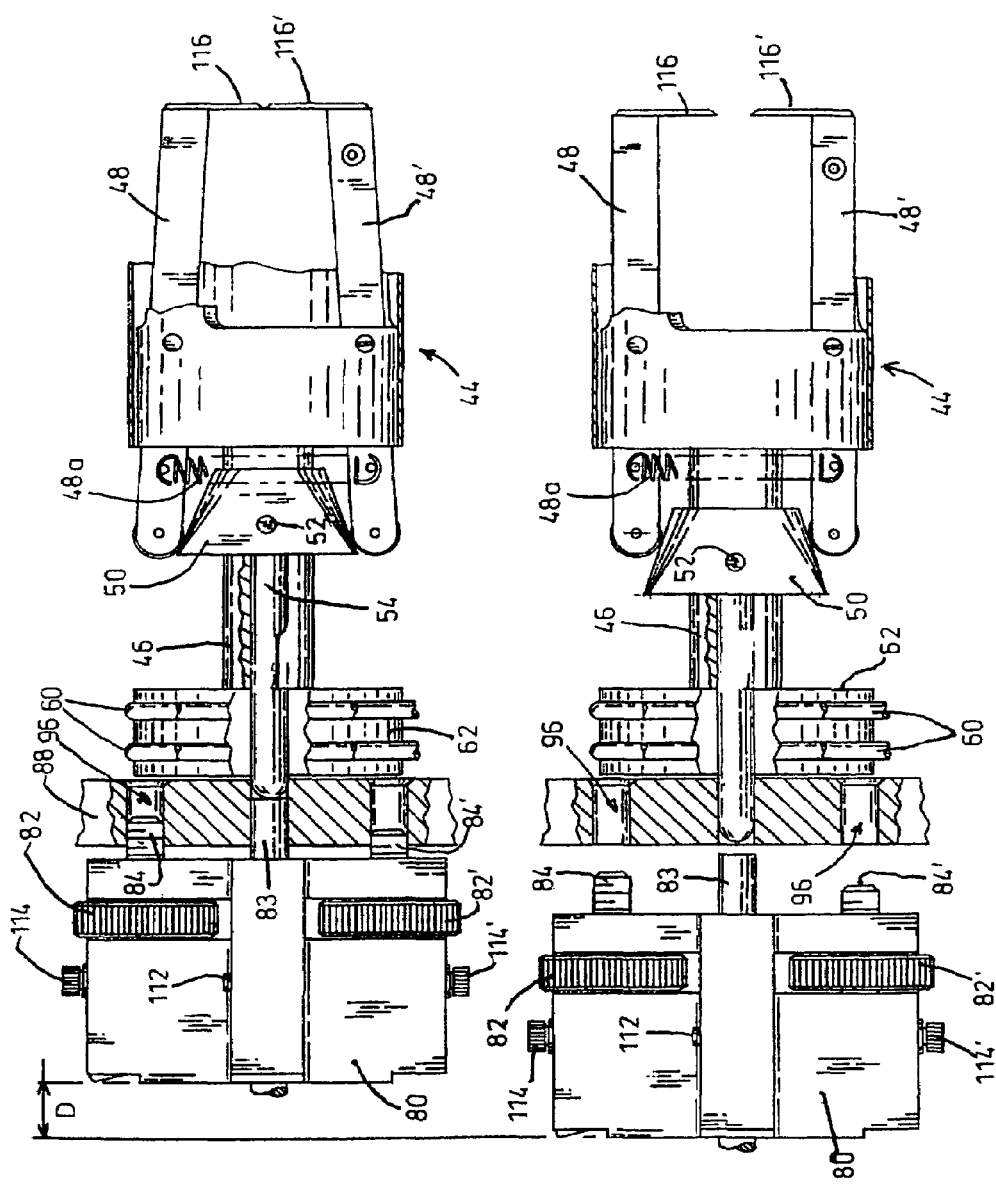
FIGS. 9A and 9B are plan views of the element of FIG. 8, together with other elements, in two positions of relative movement.

Referring now to FIGS. 9A and 9B, turret 80 is shown in its forward and rear positions, respectively, relative to elements of cutter mechanism 44. Forward and rear, linear movement of turret 80 is effected by operation of stepper motor 68 to travel upon lead screw 70, thereby moving inner carriage 42 upon which the turret is mounted. When apparatus 10 is ready to receive a workpiece (wire), inner carriage 42 is in its forward position of FIG. 9A wherein the forward end of fixed shaft 83 contacts the rear end of cutter mechanism shaft 54, moving member 50 to its forwardmost position and rotating arms 48, 48' to fully close blades 116, 116', i.e., to bring the cutting edges of the blades substantially into mutual contact. In this example the wire is axially inserted, through shield opening 22 and the space between the gripping surfaces of gripper members 32, 32', which are initially in the open or most widely spaced position, until the terminal end of the wire contacts blades 116, 116'. The operator then presses cycling button 23 to begin the sequence of operations resulting in cutting and, if desired, stripping of a plurality of covering layers. During the ensuing sequence of operations, which takes place without further intervention by the operator, turret 80 is moved by stepper motor 68 to the rearward position of FIG. 9B, wherein shafts 83, 84, 84' and 84" are removed from clearance openings 96 to permit rotation of turret 80 by stepper motor 78.

However the invention covers also examples where the wire may be inserted radially through a respective opening and between the blades which then have to hold in a special inserting position. In such a case or in the previous case any suitable means to detect the axial position of the wire may be utilized. One example is the system of WO-A-98/08283, another example is the system of WO-A-98/47209. Both published length measuring systems from the applicant are enclosed herewith by reference.

Upon actuation, stepper motor 72 (FIG. 7) travels along lead screw 77 to move frame member 76 and wedge 74 forwardly from its initial position by a distance commensurate with a value previously entered into electronic memory by the operator. This value is selected as a function of the outside diameter of the wire and the material of the wire so that the gripping force exerted by gripper members 32, 32' is sufficient to hold the wire during cutting/stripping operations, but is not an excessive force which might damage the wire. When the wire is securely clamped, stepper motor 68 is actuated to travel upon lead screw 70, moving inner carriage 42 and turret 80 from the position of FIG. 9A to that of FIG. 9B. Turret 80 is moved by a distance indicated by letter D, which is—in this example—non-variable; that is, motor 68—if performed as a stepper motor—is indexed by the same number of steps upon each actuation in both directions of movement. As turret 80 moves to its rearward position, the biasing force of spring 48a, urging the rollers on arms 48, 48' toward one another, causes member 50 to slide rearwardly on hollow shaft 46, thereby moving blades 116, 116' to the fully open position, spaced by a distance greater than the diameter of the clamped wire. Substantially simultaneously with actuation of stepper motor 68, motor 56 is actuated to rotate cutter mechanism 44.

With the elements in their positions of FIG. 9B, stepper motor 78 is actuated to rotate turret 80 by 90 degrees. Referring again to FIG. 8, turret 80 is movable in 90 degree increments to any of four positions. In the position shown, fixed shaft 83 is at position I. Assuming turret 80 rotates in a counterclockwise direction (as viewed in FIG. 8), shaft 83 will be in position IV after indexing once, and will be at positions III and II upon successive further indexings. The shaft in position I is axially aligned with shaft 54 of the cutting mechanism. With the blades in the open position, stepper motor 64 is actuated to travel on lead screw 66, moving outer carriage 40 forwardly upon rods 34, 34' by a distance which has been entered by the operator and stored in electronic memory as the length (from the terminal end of the clamped wire) of the first cut. Stepper motor 68 is then actuated again to move turret 80 (inner carriage 42) forwardly to the position of FIG. 9A. During such movement, shaft 84, which is now in position I, contacts the end of shaft 54, moving member 50 axially to pivot arms 48, 48' and move blades 116, 116' toward one another. When inner carriage 42 (turret 80) reaches its forwardmost position, the spacing of the blade cutting edges, i.e., the depth of the cut, is a function of the position of the front end of shaft 84. This position has been—in this example—manually set by the operator, in a manner described later, and thus mechanically stored to produce the desired depth of cut.

Upon completion of the first cut, at the electronically stored length and mechanically stored depth, motor 56 is deactuated to stop rotation of the cutter mechanism. If desired, the blades may then be opened by a small amount to prevent scraping the central conductor or other wire layer as the severed slug is fully or partially pulled from its initial position; such opening is performed by rearward movement of inner carriage 42 by a portion of the total number of steps which stepper motor 68 is indexed to move the carriage to its terminal position. Stepper motor 64 is then actuated to move outer carriage 40 and the cutter mechanism in the rearward direction by a distance previously entered by the operator as the desired strip or pull length, if any. Stepper motor 68 is then actuated to move inner carriage 42 to its terminal rearward position, thereby fully opening blades 116, 116', and motor 56 is actuated to resume blade rotation. Outer carriage 40 is then moved forward by stepper motor 64 to position the blades at the second length of cut. Inner carriage 42 is moved forward, bringing shaft 84" into contact with shaft 54, thereby moving the blades radially to the second, mechanically stored depth of cut. After the final cut/pull operation, stepper motor 72 is returned to its terminal rear ("home") position, thereby releasing clamping members 32, 32' to permit withdrawal of wire 21. Motor 56 is again actuated to dislodge any debris from the blades as stepper motor 68 moves inner carriage 42 rearwardly to fully open the blades. Blade rotation is stopped and stepper motor 64 moves outer carriage 40 to its home position (if it is not already there after the final pull operation). Stepper motor 78 indexes turret 80 to its home position, with shaft 83 in position I, aligned with shaft 54.

The illustrated embodiment of apparatus 10 permits the operator to manually adjust the axial positions of three shafts, thereby mechanically storing the depths of three successive cuts to be made in the covering layers of the clamped wire, although it will be readily apparent that either more or less than three adjustable shafts may be provided to make the capabilities of the apparatus commensurate with its intended use. Manual adjustment of shafts 84, 84', 84" is effected while turret 80 is in its forward position (FIG. 9A), wherein the set screw and nut associated with the shaft in position I (FIG. 8) is manually accessible through opening 20. Turret 80 is moved to its rear position, rotationally indexed to position the desired shaft in position I, and returned to its forward position for manual adjustment by sequential actuation of stepper motors 68, 78 and 68 in response to a single keypad actuation, as explained later in more detail. According to a novel adjustment method, after backing off the set screw of the shaft in position I, a gauge (e.g., a pre-stripped wire corresponding to the wire to be processed) is placed between the blade cutting edges and the nut is rotated manually in the appropriate direction, thereby moving (or allowing spring 48a to move) shaft 54 until the blade edges lightly contact (or are slightly spaced from) the gauge. The set screw is then advanced back into contact with the threaded shaft, fixing its axial position relative to turret 80 and mechanically storing the depth of cut produced by moving inner carriage 49 to its terminal forward position with the adjusted shaft in alignment with shaft 54.

It may be useful to note that the four described limit switches 98, 99, 102 and 109 are provided only to establish "home" positions of the four corresponding stepper motors, principally during set-up and power-up of apparatus 10. That is, they are not in use during the described sequence of wire processing operations. However alternatively, when cheaper motors are used and less electronic control, the limit switches may be used also during the described sequence of wire processing operation. The home rotational position of turret 80, with fixed shaft 83 in position I is established by contact of protrusion 110a' on the rear side of turret arm 110a with contact button 102a, as shown in FIG. 2. It is also noted that springs 66a and 70a surround lead screws 66 and 70, respectively, to pre-load stepper motors 64 and 68 in accordance with conventional practice.

Figure 10:
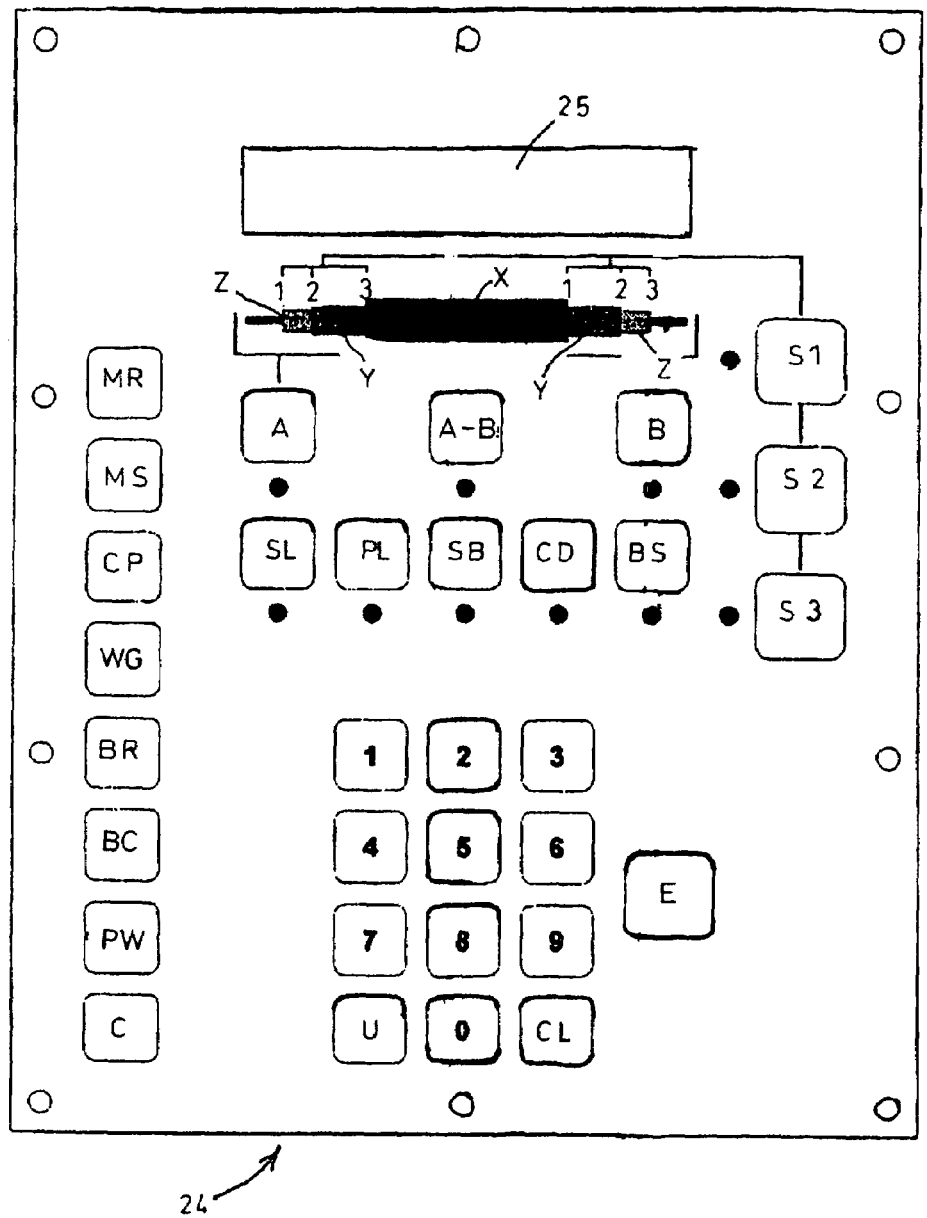
FIG. 10 is a plan view of an example of the keypad layout.

The steps performed by an operator in preparing the machine for performing a specific sequence of processing steps may be best understood by reference to the example of keyboard layout shown in FIG. 10. The layout preferably includes a pictorial example of a wire having three covering layers X, Y, and Z coaxially surrounding a central conductor. Opposite ends of the wire are referred to as A and B, with keys bearing these letters positioned in proximity to the pictured wire ends. The significance of this arrangement and the versatility which it adds to operation of apparatus 10 is explained later. To enter a program of values corresponding to successive operations to be carried out at each step, the operator presses the A button (or it is automatically activated at power-up) and then presses the "Step 1" button at the right side of the keypad. This actuates stepper motors 68, 78 and 68 in sequence to move inner carriage 42 to its rear position, rotate turret 80 to place arm 110a in position I, and move the inner carriage back to its forward position. Set screw 114 and nut 82 are now manually accessible through opening 20., and the position of shaft 84 is adjusted in the manner previously described to mechanically store the depth of the first cut. The operator then presses the "strip length" button and enters the value on the numeric portion of the keypad corresponding to the length of the first cut.

Values corresponding to the parameters represented by the buttons in the horizontal row under the AB buttons (or default values for these parameters) may then be sequentially entered by the operator for Step 1 of the processing operation. The "pull length" button represents the distance of linear travel of the blades in pulling or stripping the severed layer from its original position, the "step back" button corresponds to a distance of outward, radial travel of the blades after cutting to the pre-set depth and before beginning the pull/strip linear travel, the "cut dwell button sets the time for which the blades continue to rotate after reaching the cutting depth before rotation is stopped, and the "blade speed" button sets the speed of radial movement of the blades (i.e., the speed of stepper motor 68). After entering all Step 1 values, the operator then presses the "Step 2" button, which indexes turret 80 to permit manual adjustment of the depth of the second cut. The operator then proceeds to make the manual adjustments and keypad entries for the second and third steps of the operation and apparatus 10 is then ready, upon pressing cycling button 23, to perform the complete sequence of steps on a wire end.

It is sometimes required that the length(s) of cut(s), and possibly other parameters be different at opposite ends of a wire, although the depths of the cuts remains the same. In such situations, the operator may press key A and manually store the depths of cuts and electronically store other parameters in the manner just described. The operator then presses the B key and enters another sequence of values corresponding to the parameters indicated by the horizontal row of keys to be performed at end B. When successive processing operations are to be performed alternately according to programs A and B, the operator presses the "AB alternate" button before commencing the first operation. When the apparatus has completed the sequence of steps at end A, and the elements returned to their initial positions with the gripper members released, the wire may be withdrawn, reversed end-for-end, and reinserted until the terminal end of the wire contacts the blades. Upon the next actuation, the apparatus effects the processing operations previously entered and stored electronically for end B. The depths of the cuts, of course, are the same at both ends, corresponding to the mechanically stored values resulting from manual adjustment of the threaded shafts by the operator prior to initial actuation. It will be understood, of course, that the alternating (A and B) sets of parameters may be performed on the ends of two different wires, if desired, rather than on opposite ends of the same wire, provided that the depths of cuts be the same in both sequences.

Further options are provided by the buttons in the vertical column on the left side of the keypad. Programs (e.g., relating to processing parameters for a particular type of wire) may be stored in and recalled from memory using the top two buttons. The "clamp pressure" button provides the operator with a plurality of choices of the distance of travel of stepper motor 72 to vary the spacing of the clamping jaws in the fully closed position. The "wire guide" button allows entry of values corresponding to the wire guide (a bushing having an opening corresponding to the diameter of the wire to be processed) which is installed at the front of cutting mechanism 44 as described in U.S. Pat. No. 4,993,147; entering this number may assist in locating a previously entered program for the type of wire used with this wire guide and/or may be electronically tied to the "clamp pressure" value to make this pressure correspond automatically to wire diameter. The "blade rotation" button permits the operator to select either clockwise or counterclockwise rotation of the blades. The "blade change" button is pushed to place the elements in position for installation of new blades in the manner of U.S. Pat. No. 4,993,147, and the "password" and "counter" buttons provide means for limiting access to the programming controls and for counting the number of processing operations, respectively.

From the foregoing it will be understood that the present invention provides a useful and versatile form of wire processing apparatus with means for electronically storing and automatically performing many processing functions and parameters, although entering a plurality of successive cutting depths is performed entirely manually and stored mechanically. Linear movement of inner carriage 42 between two distinct, forward and rear positions effects radial movement of the cutting blades to cutting depths determined by the operator-adjusted axial positions of a plurality of threaded shafts. The predetermined positions of the inner carriage are established by the number of steps by which stepper motor 68 is indexed, a value which is a permanent, non-adjustable and non-variable part of the permanently installed software of apparatus 10. Although manual setting of the elements which control the depths of cuts is more time-consuming than entering and storing values electronically, the manual settings are continuously variable, i.e., an analog operation, and not subject to preselected resolution limits of a digital procedure.

Further alternatives to the foregoing specification lie within the scope of the invention: E.g. instead of stepper motors ordinary motors may be utilized, as long as they are controlled by switches, stops, ratchets or the like. Further alternatives, variants and details will become understandable from respective claim language and from drawings.

In the following the drawings 11–27 are discussed in more details; it is to be noted that in most cases identical numerals refer to almost identical parts; whereas identical numerals with different indices refer to similar parts with similar functions.

Figure 11:
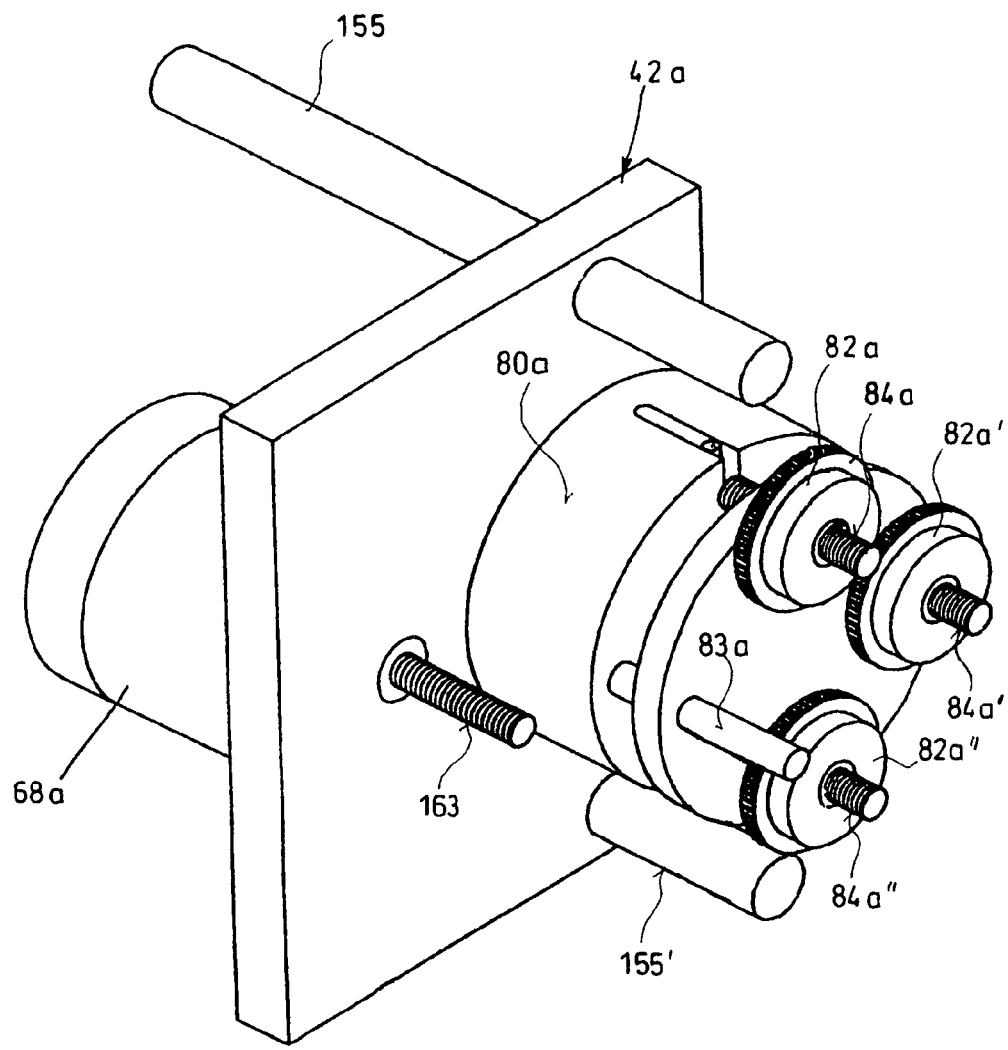
FIG. 11 shows a perspective view of the elements for storing cutting depths information.

FIG. 11 shows a variant of the mechanical storing element of FIG. 2 with a rotatable turret 80*a* and the fixed shaft 83*a* and the threaded shafts 84*a*. Similar to FIG. 2 circular nuts are provided for manual adjustment of the threaded shafts 84*a*. A stepper motor 68*a* or a different drive is provided to move an inner carriage 42*a* backward and forward; from a open blade position to a closed blade position as described above, two guiding rods 155 and 155' keep the inner carriage 42 a in position, as will be understood from FIG. 12.

Those guiding rods 155 and 155' are guided in a plate 153 and in a back wall 88*a'* of a outer carriage 40*a*.

Figure 12:
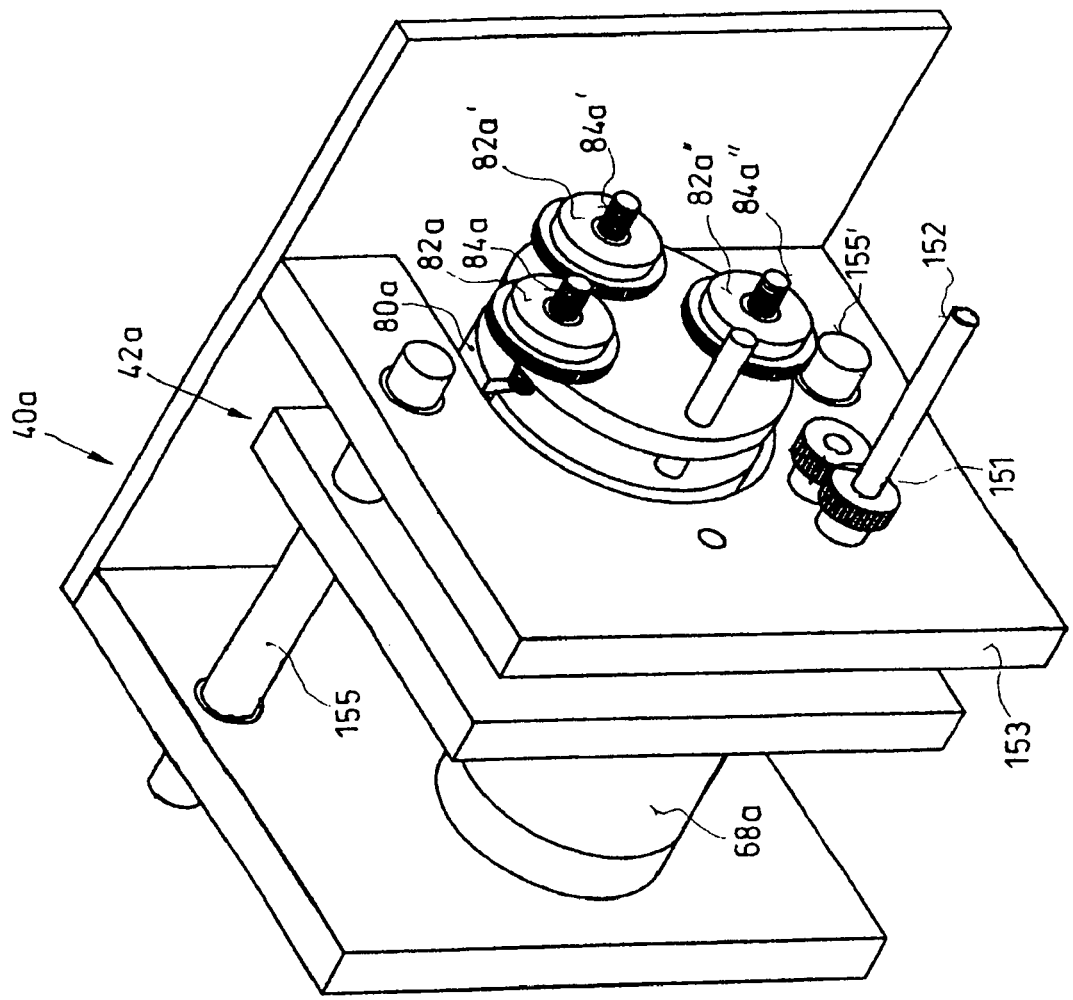
FIG. 12–14 show the elements of FIG. 11 with an remote controlled adjustment.

However FIG. 12 shows a slightly amended version of FIG. 11. Whereas the circular nuts 82*a* of FIG. 11 can be turned only manually, the nuts 82*a* of FIG. 12 may be rotated by a remote control. That remote control may be either also a handdriven adjustment rod 152 which points through all casings of the stripping apparatus, in order to allow a user to adjust the position of the threaded shafts 84*a* by hand without working with the users finger inside the apparatus. On the other hand the adjustment rod could also be connected to an electrical drive, especially a stepper motor 68*b*, as shown in FIG. 13. Such stepper motor would be able to position the threaded shafts 84*a* upon discretion of the user or of a program installed for that purpose. The adjustment rod 152 cooperates with a gear 151. Said gear 151 cooperates—when in adjustment position with the toothed outer surface of the nuts 82*a*, whenever a nut 82*a* is next to the toothed wheel of the gear 151. Stepper motor 68*b*, adjustment rod 152, gear 151 and the toothed outer surface of the respective nut 82*a* form thereby a substitution of a users fingertips which are used to adjust the nuts 82*a* as discussed above.

Figure 13:
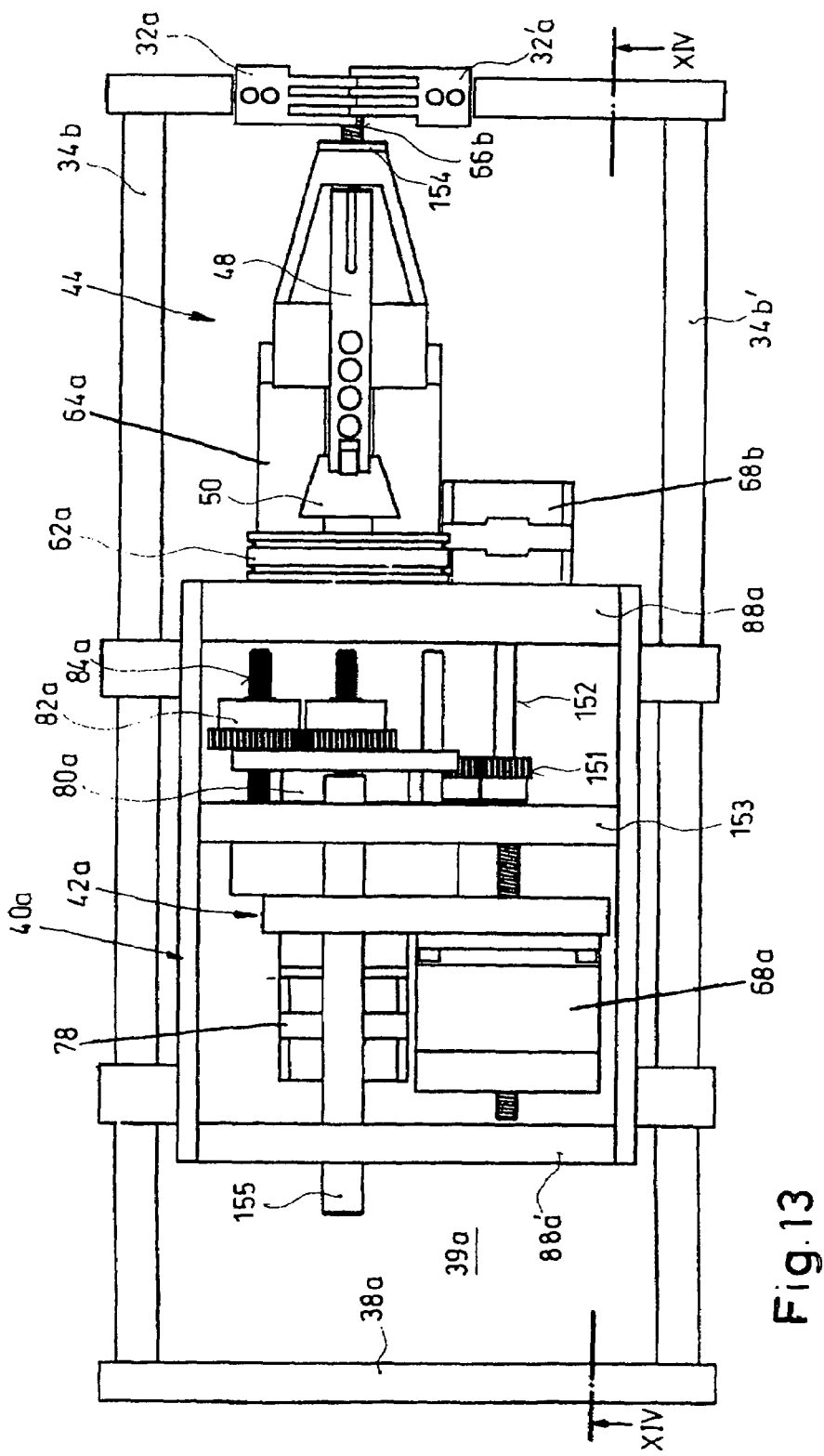

FIG. 13 shows the complete mechanical part of an apparatus according to FIG. 12 from above, the outer carriage 40 has a front plate 88*a*, said front plate 88*a* may be shifted backwards and forwards by a stationary lead screw 66*b* which is driven by a stepper motor 64*a* or a different drive, the movement of the outer carriage is done for axial positioning the blades relative to a cable, as disclosed above.

Figure 14:
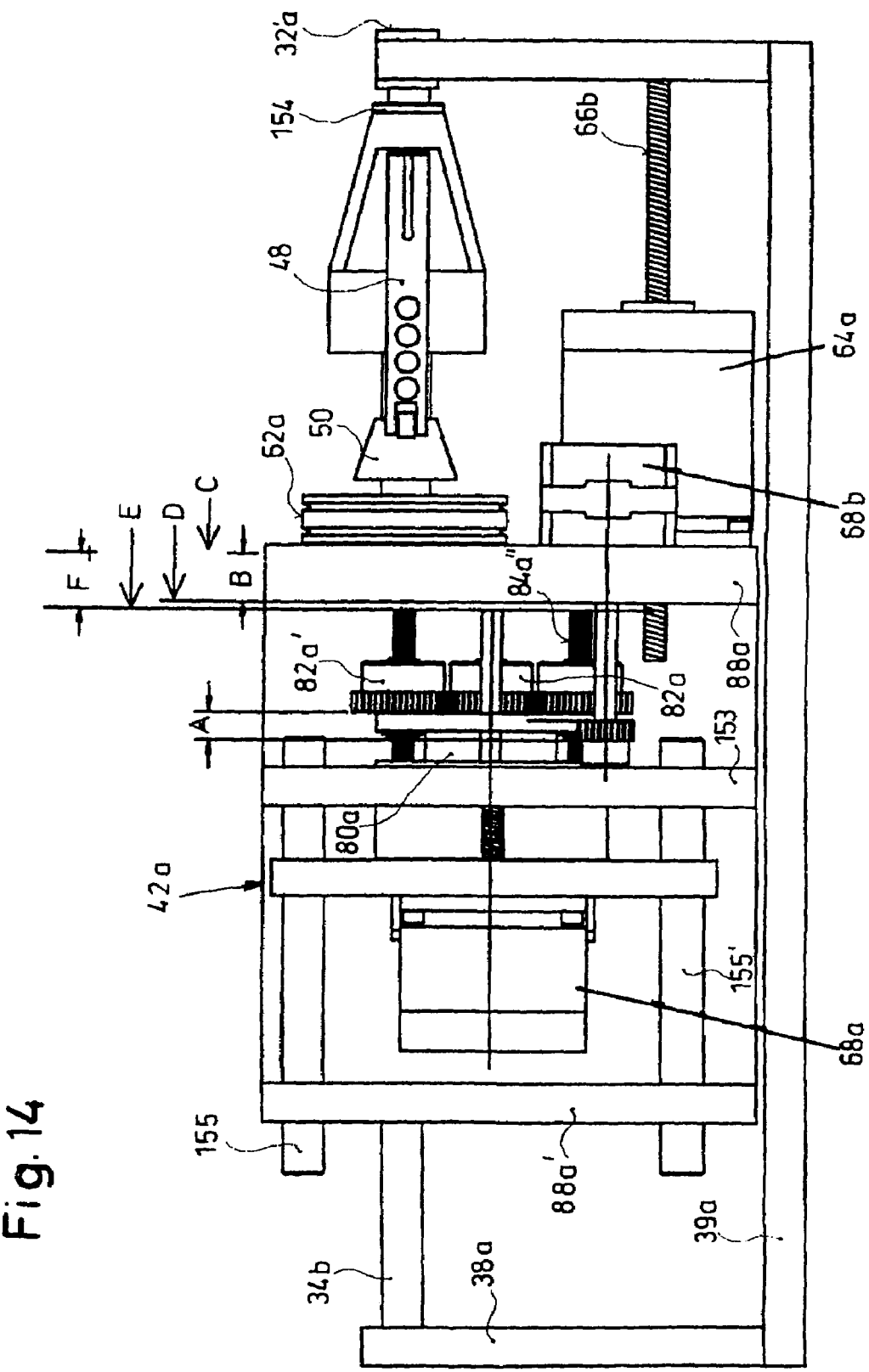

FIGS. 13 and 14 show also rods 34*b* and 34*b'* for guiding the outer carriage 40*a* and a rear end plate 38*a*. It further discloses a centering bushing 154 rotatably mounted together with a cutting mechanism 44 and a wedge member 50 for the blade depth control, as discussed above. The arms 48 and 48' an wedge 50 are the same as in FIG. 2. FIG. 13 further discloses gripper members 32*a* and 32*a'*. These members my be constructed and may function as the members 32 and 32' of FIG. 2 or may be built and controlled like the members 32*b* and 32*b'* of FIG. 15. FIG. 14 is a cross section through FIG. 13 along the line XIV—XIV.

Figure 15:
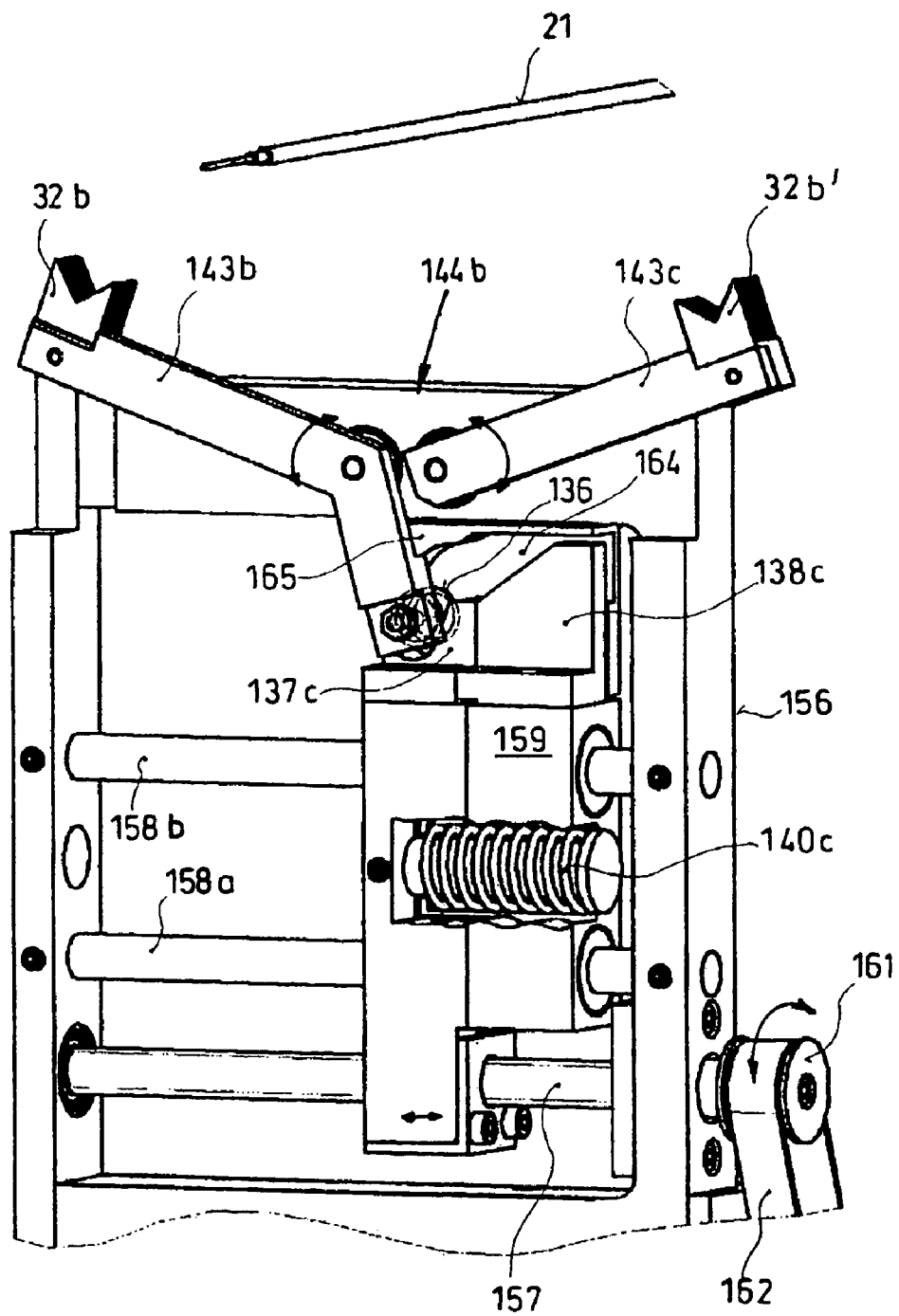
FIG. 15 discloses an alternative to the wire clamping system of FIG. 7 with open jaws.

The novel clamping apparatus of FIG. 15 is used preferably with the novel wire processing apparatus, but which however could be used also with advantage with different apparatuses. It has a frame 156. The frame 156 bears a lead screw 157 and holds two guide rods 158*a* and 158*b*. It bears also a gear 144 of a common kind. The gear 144 carries clamping levers 143*b* and 143*c* with grippers 32*b* and 32*b'*. The lever 143*b* is elongated and bears a roller 136 which rolls in a cam control curve 164. This curve has three elements: An upper opening element 165 which forces the roller 136 downwardly when the element is pushed to the right side in the drawing.

It has a second element which is a rigid closing wedge 137*c*. Said closing wedge pushes the roller 136 and therewith the lever 143*b* relatively quickly and directly (playless) upwardly in a closing direction of the grippers 32*b* and 32*b'*. The closing wedge 137*c* has a flat portion which allows the roller to move the lever 143*b* slower in closing direction, when the wedge 137 is further pushed leftward in the drawing. The third element is a pressure wedge 138*c*. It may further close the grippers 32*b* and 32*b'*—when it is pushed to the left in the drawing—to the extent that when the grippers 32*b* and 32*b'* touch a cable or the like, the will not be moved further in closing direction, even if one would try to push the pressure wedge 138*c* further to the left. However the three elements 165, 137*c* and 138*c* are interconnected so that the movement of on of the elements tends to move also the other elements. The opening element is rigidly connected to the closing wedge 137*c*. Both are connected via a spring 140*c* with a guide block 159 which carries the pressure wedge 138*c*. The spring 140*c* is such mounted between the respective elements, that upon movement of the closing wedge to the left, the pressure wedge 138*c* is pulled also to the left as long as it is not withheld by the roller 136, when the grippers 32*b* and 32*b'* are closed or clamp a cable. If in such withheld situation the closing wedge however is further pushed leftwards, then it separates from the pressure wedge 138*c* against the force of the spring 140*c*. Further movement to the left means increasing the pressure on the cable 21. That is the crux of this unique system: it allows to increase or decrease the clamp pressure on a cable by motorical shifting a part (closing wedge) in closing direction whereas that part has at first a play less interconnection to the clamp.

Figure 16:
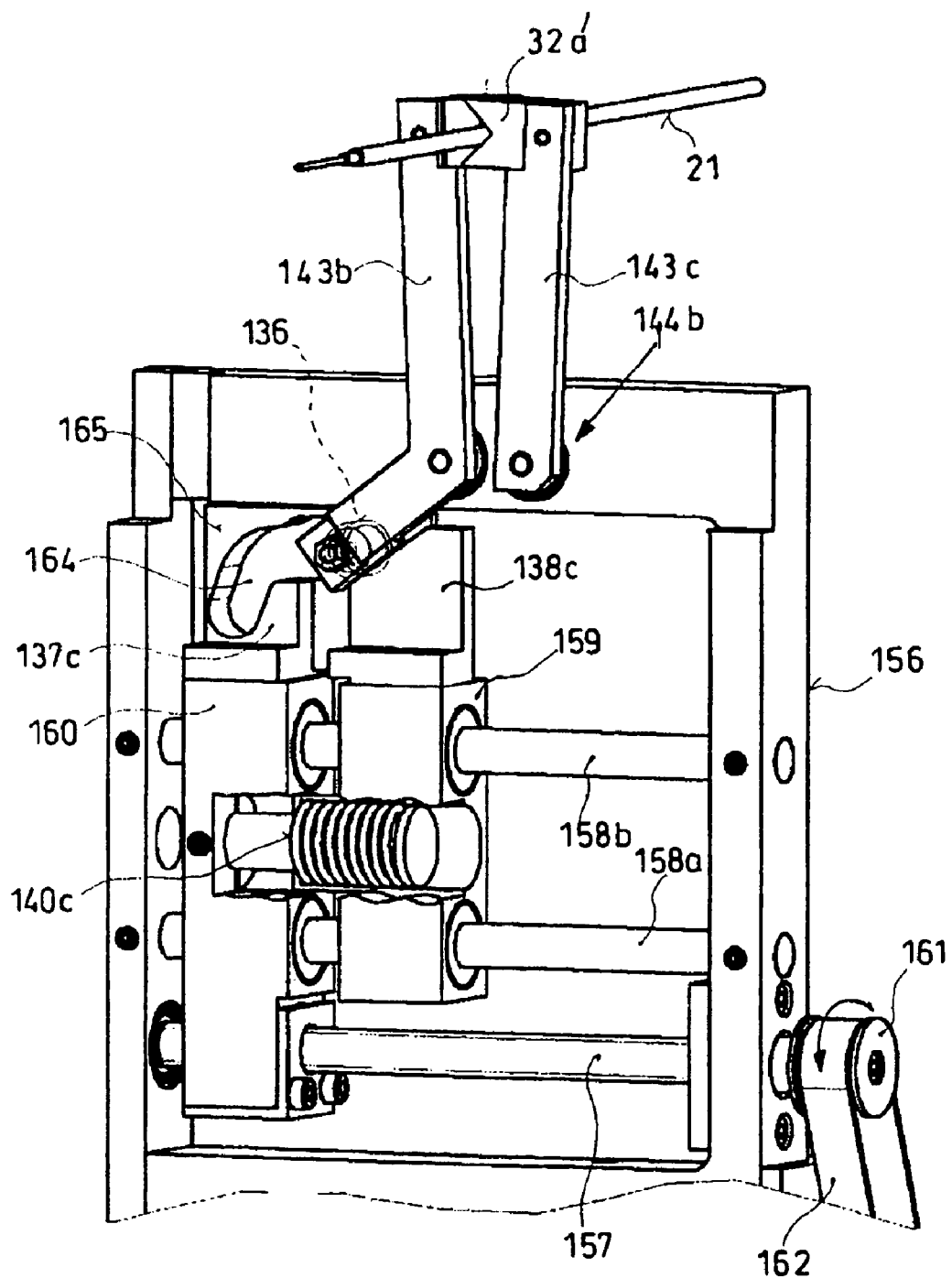
FIG. 16 shows the alternative of FIG. 15 with closed jaws.

This particular construction is thus particular different to a system a disclosed in the EP-B-352038, where an electrical drive like a DC-motor is operable to increase or decrease the force of grippers which are driven by said motor. In this invention it is not the power of an electrical drive controlling the force exerted on a cable but purely the quantity of turns of a motor shaft. This will be understood when looking at the lead screw 157 which is responsible for moving the closing wedge left or right. Said lead screw is connected to a pulley 161 which is turnable by a toothed belt 162. The amount of rotations of said pulley 161 is thus responsible for the amount of left or right movement of the closing wedge 137*c* and of the force which is exerted by the grippers 32*b* and 32*b'* on a cable 21 if clamped. FIG. 16 shows such a clamped situation with the tensioned spring. The further advantage of this novel clamping system is that by changing the speed of revolution of the pulley the speed of opening or closing the grippers 32*b* and 32*b'* can be varied as well as by increasing or decreasing the amount of revolutions of the pulley the force exerted by the grippers 32*b* and 32*b'* can be varied.

Figure 17:
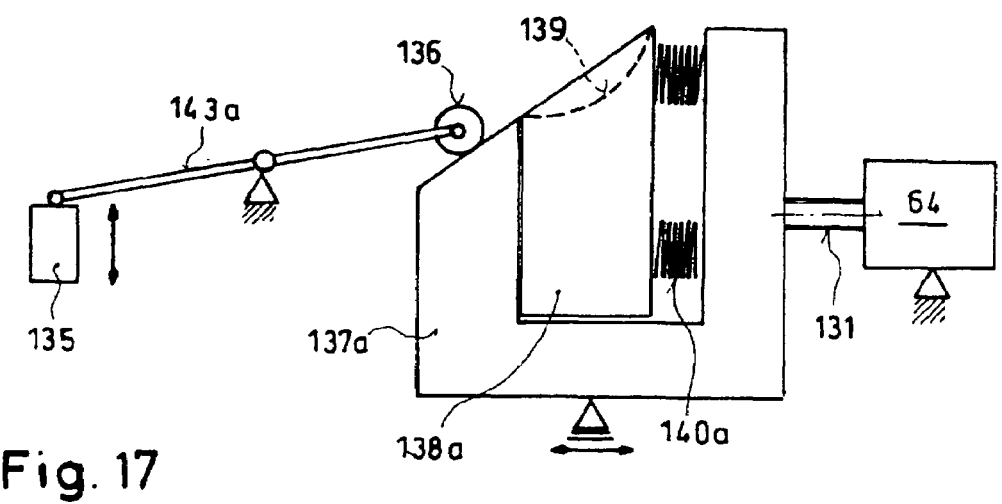
FIG. 17 shows a variant of a control part of the novel clamping system.

FIG. 17 refers to a variant of the closing wedge and pressure wedge system. A closing wedge 137*a* bears a pressure wedge 138*a*. Springs 140*a* push the pressure wedge permanently toward the front part of the closing wedge 137*a*. A stepper motor 64 propels the closing wedge 137*a* toward a roller 136 on a lever 143*a* which shifts a jaw 135. Such jaw could be of the kind of the grippers 32*b* and 32*b'* or also different. It could for example also a centering jaw of centering means in the sense of the cited EP B 352 038.

The pressure wedge may have a special curve 139, as symbolically shown. Such special curve may be designed to control the pressure increase in a special way. A similar curve may be also designed on the wedge surface of the closing wedge 137, as for example shown in FIG. 19.

Figure 18:
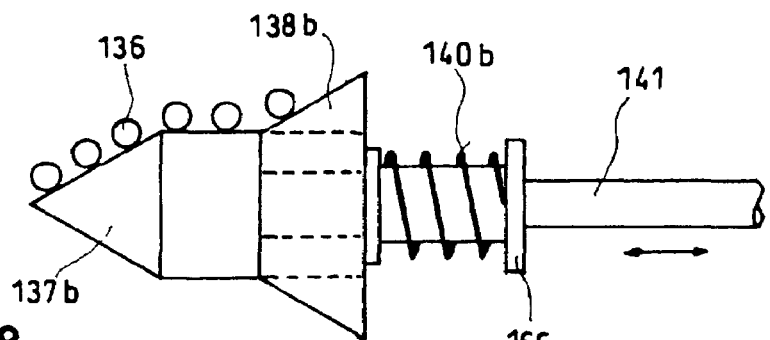
FIG. 18–20 show a further variants of that control part
Figure 19:
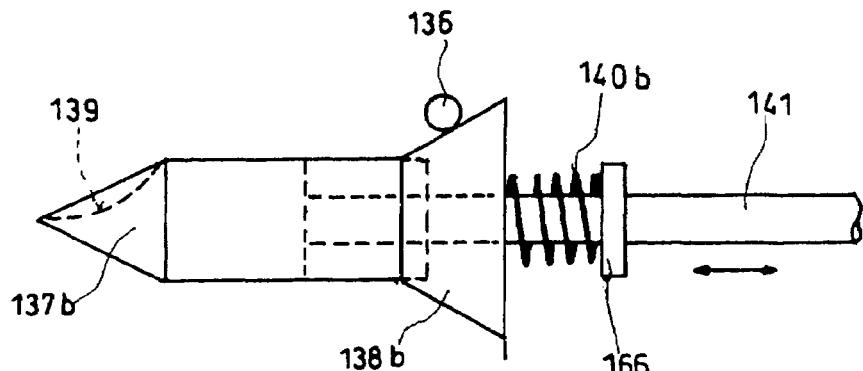

A further variant of the novel clamp closing system is shown in FIGS. 18 and 19, which show the closing status (FIG. 18) and the pressure increasing status (FIG. 19). A cylindrical cone mounted on a tube build the closing wedge 137*b*. The tube bears a ring shaped cone 138*b* which is spring biased in axial direction by a spring 140*b*. The spring 140*b* rests on a collar 166 which is rigidly connected to a rod 141. When the rod 141 is pushed to the left and a roller 136 of a lever or the like resists the cone 138*b* as shown in FIG. 19, then the spring 140*b* is squeezed.

Figure 20:
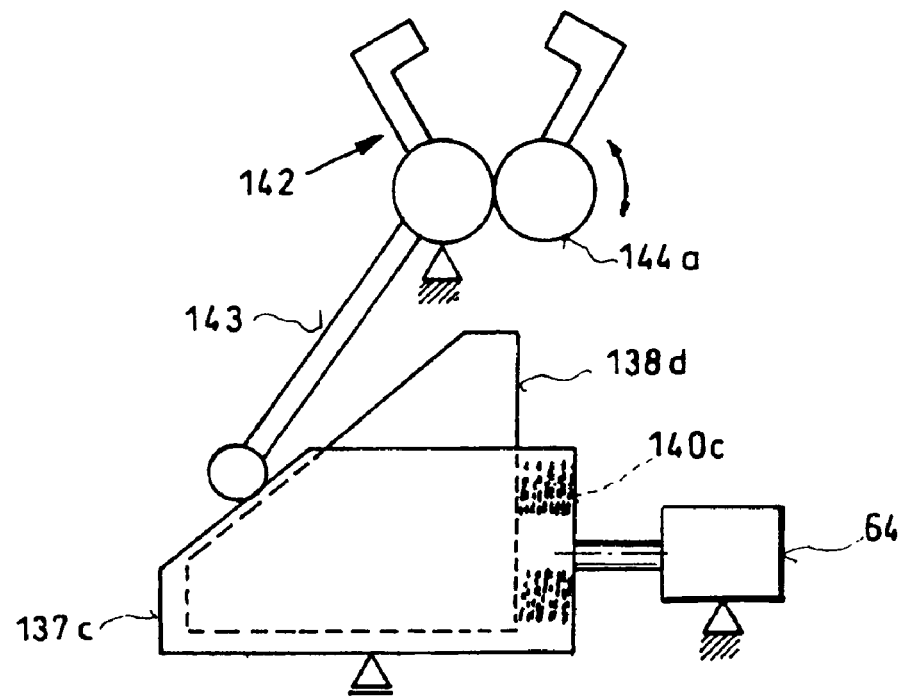

A further variant is shown in FIG. 20, where a pressure wedge 138*d* is spring biased similar to FIG. 17. Differently to FIG. 17 a lever 143 is provided which is directly connected to a rotatable wheel of a gear 144*a* which carries the jaws 142.

FIGS. 21 and 22 refer to a different aspect of the invention: It shows an alternative to the previous disclosed mechanical storage means. It shows—as the following figures—a wedge member 50 which is used in many cases for controlling the closing and opening movement of jaws or blades or the like. (It is to be noted that this invention covers also any technical equivalents to wedge members like knee lever constructions and the like. For the purpose of simplicity, only a wedge is shown.) An electrical drive 56*a* with an encoder is used to propel and detect the axial position of the wedge member 50. However to limit the movability of the wedge member 50 a shiftable storage element 146*a* is provided. That element carries shiftable or fixed stops which can—by stepper motor 64—be brought into an axial position beside the drive 56*a*, position. Part 146*a* is thus like a mechanical storage chip comparable with the device of the WO-A-99/34493. It cooperates with a stop member 147 which is connected to the wedge member 50. A control 148 provides for cooperation of the electrical parts. It allows also to measure cable diameters or the like by reading out the encoder, if the wedge member 50 is pushed backward or forward during a measuring procedure. Such procedure e.g. feels with the blade tips the diameter of a cable or of a gauge and transmits that information via levers (not shown), rollers 136 and wedge member 50 to a spindle which then propels the motor 56*a* and encoder 145 respectively.

Figure 23:
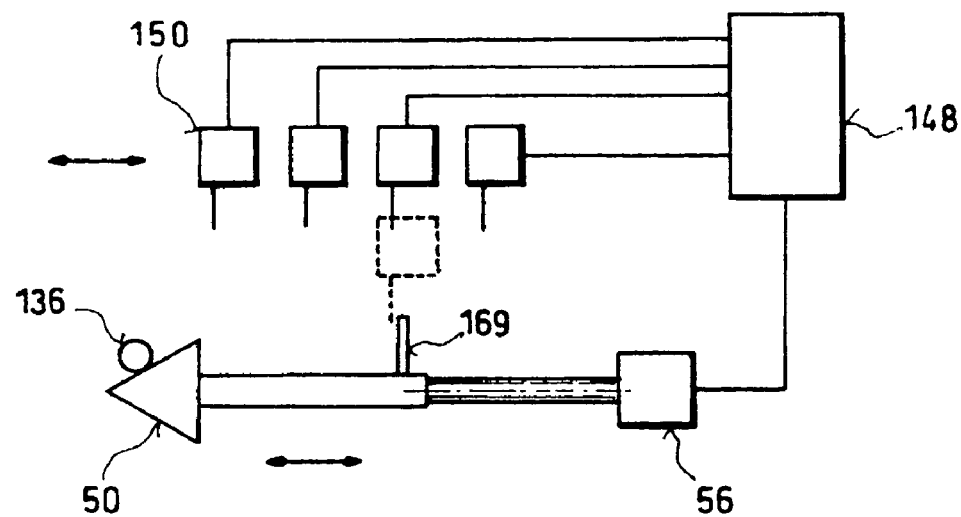
FIG. 23 show a variant of such a wedge control system with electrical switches.

FIG. 23 discloses a similar principle. However not mechanical stops hinder the wedge member 50 to move further, but sensors 150 cooperate with a finger 169 or the like of the wedge member 50 to signalize the position of the wedge member or to stop or start the motor 56 dependent of the relative positions between sensors 150 and finger 169. The sensors could e.g. as shown by dotted lines be movable upon discretion of a user. Instead of multiple sensor as shown, it is possible to have only at least one sensor which is moveable for positioning in axial direction of the wire by a separate drive. This sensor could also be a pneumatical valve or the like.

Figure 24:
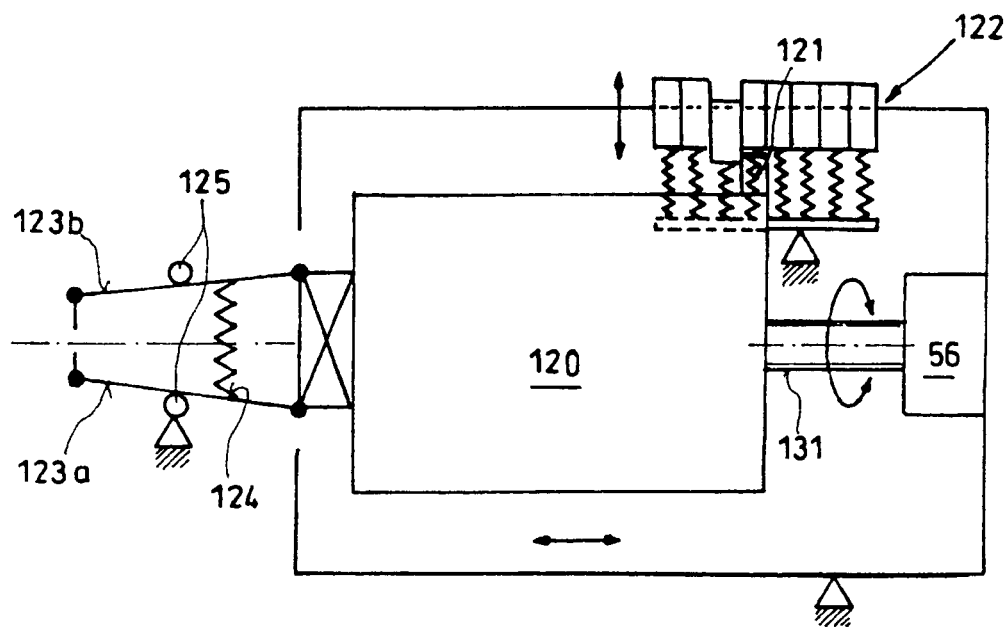
FIG. 24 shows a further variant with mechanical stops.

The variant of FIG. 24 is similar but there rigid stops 122 cooperate with a stop 121 on the stripping mechanism (an inner carriage e.g.). The stops 122 can be manually pushed into function and released manually. They may—with a separate mechanism (not shown)—eventually be also shiftable in axial direction with respect to a cable.

The blade part of FIG. 24 shows a novel system for moving blades towards and away from each other: instead of a wedge an outer guide 125 forces blade levers 123*a* and 123*b* towards each other when the mechanism 120 is pushed left or right in the drawing. A spring 124 keeps the levers 123*a* and 123*b* in contact with the guide. That system does not depend on the other features introduced by this patent application.

Figure 25:
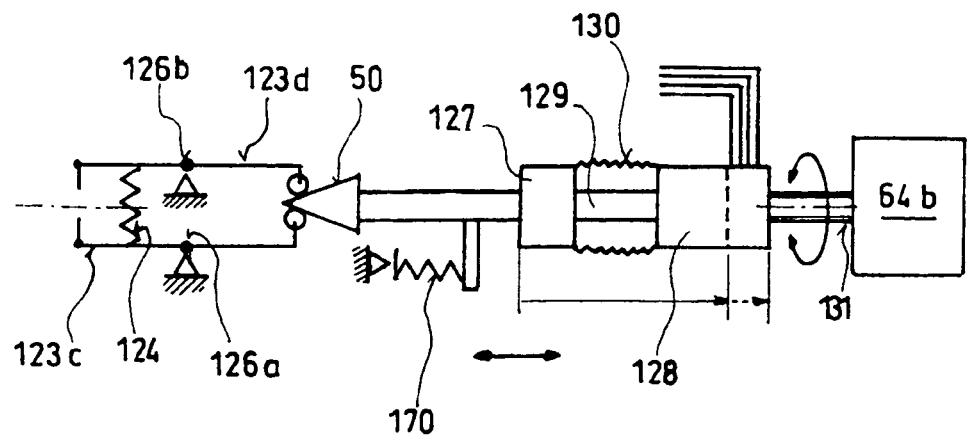
FIG. 25 show a further variant utilizing an storing element which can be changed in its shape pneumatically.

FIG. 25 indicates a different system for defining cutting depths: A mechanical part builds the length defining element:—in that case a stop 127 is connected with a piston 129 and a cylinder. The cylinder is biased from a spindle 131 from a stepper motor 64*b*. The motor can therefor shift the cylinder relative forward or backward with regard to the wedge member 50. If than the cylinder 128 is pressurized, the piston pushes the stop 127 against the wedge member 50 and fulfills therewith the cutting operation. This combination of pneumatic and electrical energy allows strong cutting forces without utilizing a strong electrical motor. A bellow 130 protects the piston non obligatory. A spring 170 biases the wedge member 50 against the stop 127 and ensures therewith a smooth cutting operation. The amount of revolutions of the stepper motor is an equivalent for the cutting depth. Hence a revolution counter, an electronic memory or even a manual adjustment knob combined with electrical control means may be used to adjust the position of the cylinder 128 and therewith the cutting depth.

Figure 26:
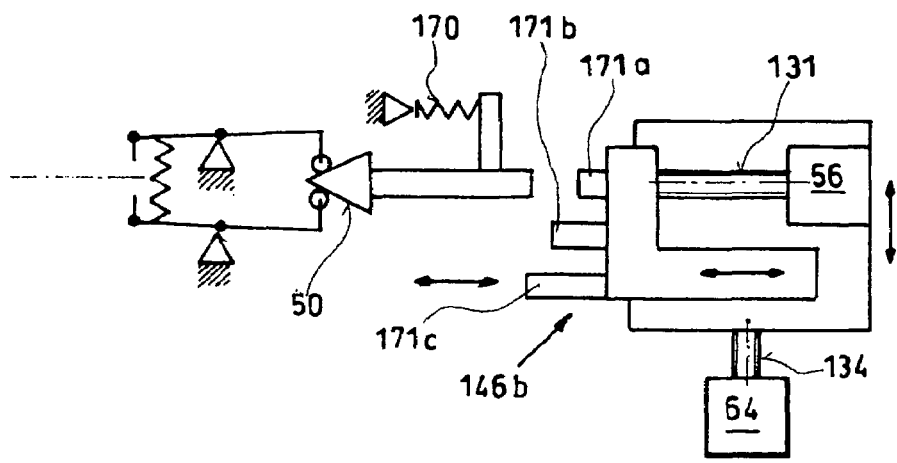
FIG. 26 shows a further variant with electrical components.
Figure 27:
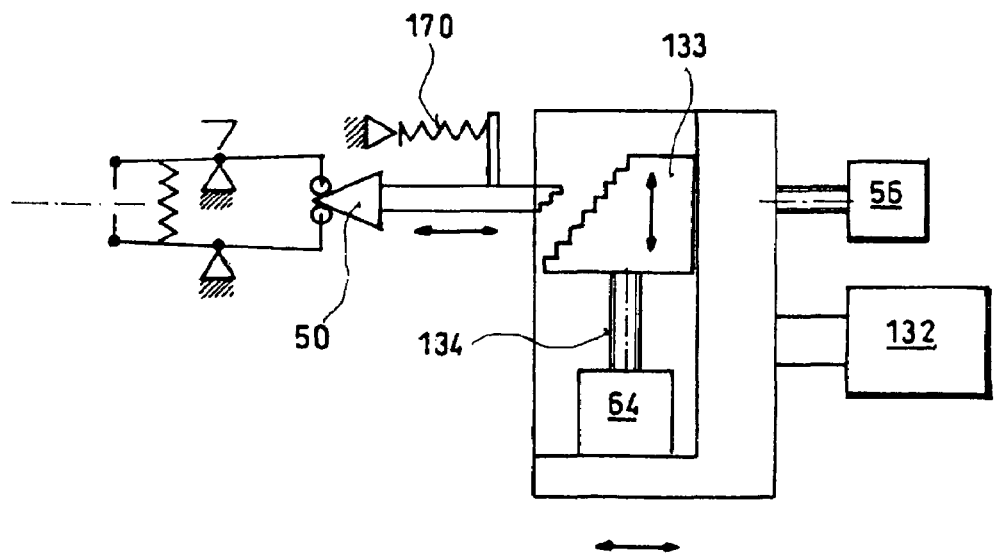
FIG. 27 a variant of FIG. 26 with a stair way like wedge with either pneumatic (132) or electrical horizontal drive.

FIG. 26 refers to a different mechanical storing element, comparable with the device of FIGS. 21 and 22. It utilizes a stepper motor 64 for positioning a storage element 146*b* relative to a wedge member 50. Said storage element 146*b* has some different stops 171*a–c* which are related to the cutting depth. The cutting process is done by pushing the storage element 146*b* towards the wedge member 50. This pushing operation may be done with a relatively cheap but strong electrical motor 56 or by pneumatic, the motor 56 does have only to move forward and backward to full front and full back positions which does not need much of control.

FIG. 7 refers to a similar principle whereby instead of stops 171*a–c* a stair like wedge is provided for a plurality of different cutting depth positions. Here also a relatively cheap but strong electrical motor 56 or pneumatic 132 may be utilized for performing the cutting operation.

The invention is not restricted to what is shown in the drawings. A man skilled in the art will understand the principles of the many different technical features shown in the drawings and by reference incorporated art and will see further possibilities and combinations of features—including especially the features of the above cited and herein incorporated WO-A- also covered by the scope of this application. The following reference numeral list as well as the text of the claims may be also used to interpret and understand the drawings and its meaning.

Reference Numerals

10 Apparatus
12 upper housing sections
14 and lower housing sections
16 power cord
18 transparent safety shield
20 opening
20a opening
21 workpiece such as a wire, cable, optical cable or similar piece
22 opening
23 cycling button
24 keypad
25 display window
26 circuit board
28 transformer
29 plate
30 fan
32 gripper member, 32a, 32b
32' gripper member, 32a', 32b'
34 rod, 34b
34a opening
34' rod
34a' opening
34b opening
34'b opening
36 forward end plate
37 fixed frame
38 rear end plate, 38a
39 base plate
39a openings
40 outer carriage, 40a
42 inner carriage, 42a
44 cutting mechanism
46 hollow shaft
46a opening
46b bearing
48 pivotally mounted arm rotating arm
48' pivotally mounted arm rotating arm
48a spring
50 wedge member
52 pin
54 rod
56 electric motor, 56a
56a opening for the shaft of motor 56
58 pulley
60 belt
62 pulley
64 stepper motor, 64a, 64b
66 stationary lead screw, 66b
66a opening
66a spring
68 stepper motor
70 lead screw
70' opening
70a spring
72 (stepper) motor
74 wedge
76 frame member
77 lead screw
77a cylindrical portion
78 stepper motor rotates the turret 80
78a opening
78b flange of stepper motor 78
78c rod
80 rotatable turret, 80a
82,82', 82" three nuts, circular nuts
83 fixed shaft
84 threaded shaft
84' threaded shaft
84' threaded shaft
86 L-shaped bracket
88 front wall (plate), 88a
88' back wall, 88a'
90 side wall
90' side wall (plate)
92 block
92a opening
92b opening
92c rod
92d opening
94 block
94a opening
94b opening
94c rod
94d opening
96 opening to provide clearance
98 limit switch
98a contact button
99 limit switch
99a contact button
100 T-shaped plate
102 limit switch
102a contact button
103 collar
103' collar
104 arm
104' arm
104 block
106 spring
108 sleeve portion
108' sleeve portion
109 limit switch
109a contact button
110, 110a, 110b, 110c arms
110a' protrusion
112 set screw
114 set screw
114' set screw
114" set screw
116 blade
116' blade
120 stripping mechanism
121 stop
122 adjustable stops
123a,b blade lever
124a spring
125 guide
126 bearing
127 stop
128 cylinder
129 piston
130 bellow
131 spindle
132 pneumatic
133 wedge element
134 position spindle
135 jaw
136 roller
137 closing wedge 138 a–d pressure wedge
138 curve (non obligatory)
140 spring
141 stem
142 jaws
143 clamping lever
144 gear
145 encoder
146 storage element
147 stop member
148 controller panel
149 fixation element
150 sensor
151 gear
152 adjustment rod for manual adjustment or for connection to a motor
152 plate
154 bushing
155 guiding rod, 155'
156 frame
157 lead screw
158a,b guide rod
159 guide block
160 lead block
161 pulley
162 toothed belt
163 spindle
164 cam control curve
165 opening part
166 collar
167 stop
168 spindle
169 finger
170 spring
171 stops
A,B opposite ends of a cable
A–F distances of possible movement of carriage numerals of FIG. 10:
25 display
X, Y, Z covering layers of a cable buttons:
MR memory recall
MS memory store
CP clamp pressure
WG wire guide
BR blade rotation
BC blade change
PW password
C counter
A button for defining the programme steps of the cable end A
A–B alternate button for changing processing from end A to end B
B button for defining the programme steps of the cable end B
Step 1 button for defining the first stripping step
Step 2 button for defining the second stripping step
Step 3 button for defining the third stripping step
SL strip length
PL pull length
SB step back (opens the blade a little bit before pulling off the covering layer)
CD cut dwell
BS blade speed
E enter
U units
CL clear

The invention claimed is:

1. Wire stripping apparatus containing a blade and a wire clamp;
   said clamp and blade being relatively movable towards and away from each other during the time when a wire is clamped;
   said apparatus further containing a drive for moving the blade radially with respect to the wire and away from the wire; and
   a mechanical depth storage device with at least two different stored depths, for setting the cutting depth of the blade.

2. Apparatus of claim 1, wherein the depth storage device contains individually adjustable storing elements.

3. Apparatus of claim 2, wherein all said storing elements are mechanical.

4. Apparatus of claim 2, wherein the storing elements are remotely controllable by a mechanical or electrical remote control or a drive remote control.

5. Apparatus of claim 1, wherein the depth storage device is remotely controllable by a mechanical or electrical remote control or a drive remote control.

6. Apparatus of claim 1, wherein the depth storage device contains a scale or readout for adjusting and/or displaying the stored depths.

7. Apparatus of claim 1, wherein at least the depth information storage device is adapted to measure and store the cutting depths by reference to a gauge or to a prestripped cable functioning as a gauge.

8. Apparatus of claim 7, wherein the measured values can be directly stored in the storage device and used as control values.

9. Apparatus of claim 1, wherein in said drive a power consumption is measured, and wherein a signal representative of said power consumption is displayed on a readout or sent to a user interface to control said drive.

10. Apparatus of claim 9, wherein the power consumption is measured to calculate the torque output.

11. Apparatus of claim 1, characterized in that the clamp is controllable to control the clamping pressure by two control members, wherein said control members are interconnected by a spring element and wherein one of said control members is directly driven by a control drive, and wherein said second of said control members is driven via said spring element from said first of said control elements.

12. Apparatus of claim 11, wherein both of said control members have at least one wedge-shaped or curved surface which engages and co-operates with a control lever which is connected with said clamp, so that advancing said first of said control elements closes said clamp to a certain extent, and so that after further advancing, said first of said control elements advances said second control element into engagement with said control lever and thereby continues to further close said clamp or increases said clamping force of said clamp.

13. Cable stripper apparatus with a first storage device for storing and providing cable stripping length information and a second storage device for storing and providing cable stripping depth information, characterized in that at least said second storage device stores information mechanically.

14. Apparatus of claim 13, wherein the second storage device for the stripping depth information is a combination of an electrical and a mechanical storage device.

15. Apparatus of claim 13, wherein the first storage device for the stripping length is electronic.

16. Apparatus of claim 13, wherein the at least one mechanical storage device contains exchangeable storage devices.

17. Apparatus of claim 16, wherein the mechanical storage device contains individual settable elements representing the stored information.

18. Apparatus of claim 13, wherein the mechanical storage device contains individual settable elements representing the stored information.

19. Cable stripping apparatus with a cutter adapted to sequentially strip a cable in subsequent following steps, characterized in that a mechanical storing device with at least two storage sites is provided for at least two different parameters of the same kind to be stored in said storage sites, including at least cutting depth parameters, wherein said stored parameters are subsequently used during a stripping process for controlling said cutter during two different steps of stripping said cable and wherein an electric or pneumatic control is provided to control said cutter and/or said storing device.

20. A wire processing apparatus having a cutter for effecting cuts through each of a plurality of covering layers on a central, elongated, filamentary member, comprising:
 a) an adjuster and a mechanical storage for storing a plurality of values corresponding to the depth of each of said cuts; and
 b) at least two elements within said storage, said elements being moveable to respective positions each corresponding to a depth of said cuts; and
 c) a drive for sequentially moving said elements to engage and move said cutter to effect said depth of one of said cuts in response to movement of said elements to one of said respective positions.

21. Apparatus of claim 20, wherein said drive for moving said elements comprises a stepper drive and an indexer for indexing said stepper drive a number of steps in each direction to effect a movement between a forward and a rear position of said stepper drive.

22. Apparatus of claim 20, wherein said elements are threaded shafts having respective, parallel longitudinal axes spaced from and at least approximately parallel to a central axis, said elements being moveable to said respective positions in directions parallel to said longitudinal axis and wherein said shafts include at least one nut each threadedly engaged with it to effect axial movement of said shafts in response to rotation of said nuts.

23. Apparatus of claim 22, wherein said shafts and nuts are mounted on a turret which is rotatable about said central axis to sequentially place said longitudinal axes in position to engage and move said cutter.

24. Apparatus of claim 23, wherein said turret is rotatable and/or moveable in a direction parallel to said central axis between predetermined fixed forward and rear positions.

25. Apparatus of claim 20, wherein said drive is a stepper motor for moving said elements linearly between predetermined, fixed, forward and rear positions to engage and move said cutter.

26. Apparatus of claims 20, wherein said apparatus includes an electronic storage for electronically storing a plurality of values corresponding to respective lengths from said terminal end to each of said cuts.

27. Wire processing apparatus comprising:
 a) a frame;
 b) a wire gripper mounted upon said frame;
 c) a motor actuable to move said gripper between a fixed first position, spaced from said wire and a variable second position, forcibly engaging and fixing the position of said wire;
 d) an indexer for indexing said motor a number of steps defining the distance of movement of said gripper from said first to said second position; and
 e) a selector for selectively varying said number of steps, thereby varying said distance of movement from said first to said second position and the force exerted by said gripper on said wire in said second position of said gripper.

28. Apparatus of claim 27, wherein said indexer comprises an electronic memory and said selector comprises an input interface for selectively entering values into said memory commensurate with said number of steps.

29. Apparatus of claim 28, wherein said gripper contains a pair of gripper members mounted for pivotal movement between said first and second positions.

30. Wire processing apparatus for performing a plurality of sequential steps of each of first and second processing operations on first and second wire ends, respectively, said apparatus containing:
 a) a gripper for releasably engaging and fixing the position of a wire;
 b) a cutter for performing said processing operations;
 c) a drive for effecting sequential movements of said cutter to perform said sequential steps;
 d) a memory for actuating said drive to effect said sequential steps in accordance with values stored in said memory;
 e) an input interface for selectively entering first and second pluralities of values, commensurate with said sequential steps of said first and second processing operations, respectively, into said memory; and
 f) a controller for said memory to actuate said drive to perform said first and second processing operations alternately upon successive actuations for both of said cable ends.

31. Apparatus of claim 30, further including a manually operable actuator for initiating said processing operations.

32. Apparatus of claim 30, wherein said input interface includes a keypad.

33. Apparatus of claim 32, wherein said input interface further includes a pictorial representation of a wire having opposite terminal ends.

34. A method to set the cutting depths of a blade of a cable stripping apparatus with a storage for storing cutting depth information, comprising the steps of:
 inserting a gauge or a prestripped respective cable into the stripping area of said apparatus;
 closing the blades of the cutter as far as the gauge or prestripped cable allows for the first cut;
 storing the respective depth of the blades in an electronic or mechanical storage;
 giving a signal via a keypad to a main control to signalize which of one of a plurality of possible cutting steps this depth refers to; and
 repeating the foregoing steps for any further stripping step until all depths relating to all stripping steps are inserted and stored.

* * * * *